United States Patent
Thubert et al.

(10) Patent No.: US 10,749,746 B2
(45) Date of Patent: *Aug. 18, 2020

(54) FULL PATH DIVERSITY FOR VIRTUAL ACCESS POINT (VAP) ENABLED NETWORKS

(71) Applicant: Cisco Technology, Inc., San Jose, CA (US)

(72) Inventors: Pascal Thubert, La Colle sur Loup (FR); Jean-Phillippe Vasseur, Saint Martin D'uriage (FR); Patrick Wetterwald, Mouans Sartoux (FR); ERic Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,139

(22) Filed: Jul. 15, 2019

(65) Prior Publication Data
US 2019/0342167 A1 Nov. 7, 2019

Related U.S. Application Data

(63) Continuation of application No. 15/599,767, filed on May 19, 2017, now Pat. No. 10,397,058.
(Continued)

(51) Int. Cl.
*H04W 84/12* (2009.01)
*H04L 12/24* (2006.01)
(Continued)

(52) U.S. Cl.
CPC ...... *H04L 41/0836* (2013.01); *H04L 41/0893* (2013.01); *H04L 47/828* (2013.01);
(Continued)

(58) Field of Classification Search
None
See application file for complete search history.

(56) References Cited

U.S. PATENT DOCUMENTS 7,782,869 B1  8/2010 Chitlur Srinivasa
7,986,915 B1 * 7/2011 Wang ............... H04B 7/155
                                                   455/7
(Continued)

FOREIGN PATENT DOCUMENTS

WO   WO-2016112306 A1   7/2016

OTHER PUBLICATIONS

Parallel Redundancy Protocol; https://en.wikipedia.org/wiki/Parallel_Redundancy_Protocol; pp. 1-3.

*Primary Examiner* — Edan Orgad
*Assistant Examiner* — Emmanuel K Maglo
(74) *Attorney, Agent, or Firm* — Behmke Innovation Group LLC; James M. Behmke; James J. Wong

(57) ABSTRACT

In one embodiment, a supervisory device in a network assigns different access points in the network to different access point groupings. Each of the different access point groupings uses a different network path to communicate with a given endpoint in the network. The supervisory device selects at least one of the access points in each of the different access point groupings for mapping to a virtual access point (VAP) for a node in the network as part of a VAP mapping. The supervisory device instructs the selected access points to form a VAP for the node. The node treats the access points in the VAP mapping as a single access point for purposes of communicating with the network.

20 Claims, 24 Drawing Sheets

US 10,749,746 B2
Page 2

Related U.S. Application Data

(60) Provisional application No. 62/415,391, filed on Oct. 31, 2016.

(51) Int. Cl.
*H04L 12/911* (2013.01)
*H04W 88/08* (2009.01)
*H04L 12/931* (2013.01)

(52) U.S. Cl.
CPC ............ *H04W 84/12* (2013.01); *H04L 41/16* (2013.01); *H04L 49/354* (2013.01); *H04W 88/08* (2013.01)

(56) References Cited

U.S. PATENT DOCUMENTS

| | | | |
|---|---|---|---|
| 9,515,914 B2 | 12/2016 | Vasseur et al. | |
| 2004/0121749 A1* | 6/2004 | Cui | H04W 72/085 455/226.1 |
| 2005/0114502 A1 | 5/2005 | Raden | |
| 2006/0094400 A1* | 5/2006 | Beachem | H04L 63/101 455/410 |
| 2006/0229018 A1 | 10/2006 | Mlinarsky et al. | |
| 2010/0110949 A1 | 5/2010 | Lundsgaard | |
| 2010/0135214 A1 | 6/2010 | Ishizu | |
| 2013/0086665 A1 | 4/2013 | Filippi | |
| 2014/0029505 A1 | 1/2014 | Rajagopalan | |
| 2014/0126466 A1* | 5/2014 | Hamdi | H04W 88/08 370/328 |
| 2015/0117180 A1 | 4/2015 | Gupta | |
| 2016/0112917 A1 | 4/2016 | Bharghavan et al. | |
| 2016/0119239 A1 | 4/2016 | Weitzman | |
| 2016/0302063 A1 | 10/2016 | Ahmed | |
| 2017/0013508 A1 | 1/2017 | Pallas | |
| 2017/0164349 A1 | 6/2017 | Zhu | |
| 2018/0098336 A1* | 4/2018 | Alpert | H04W 16/10 |

* cited by examiner

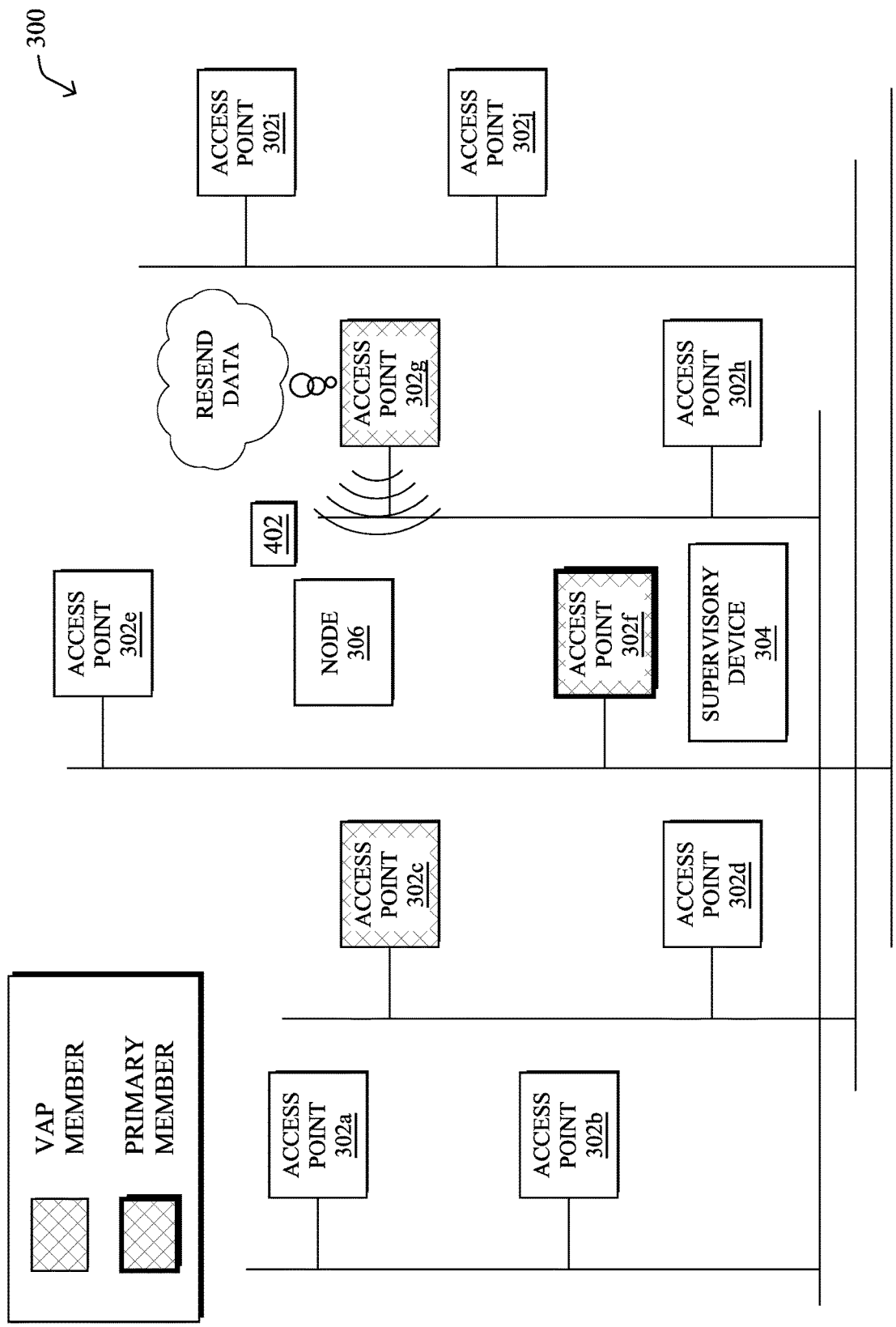

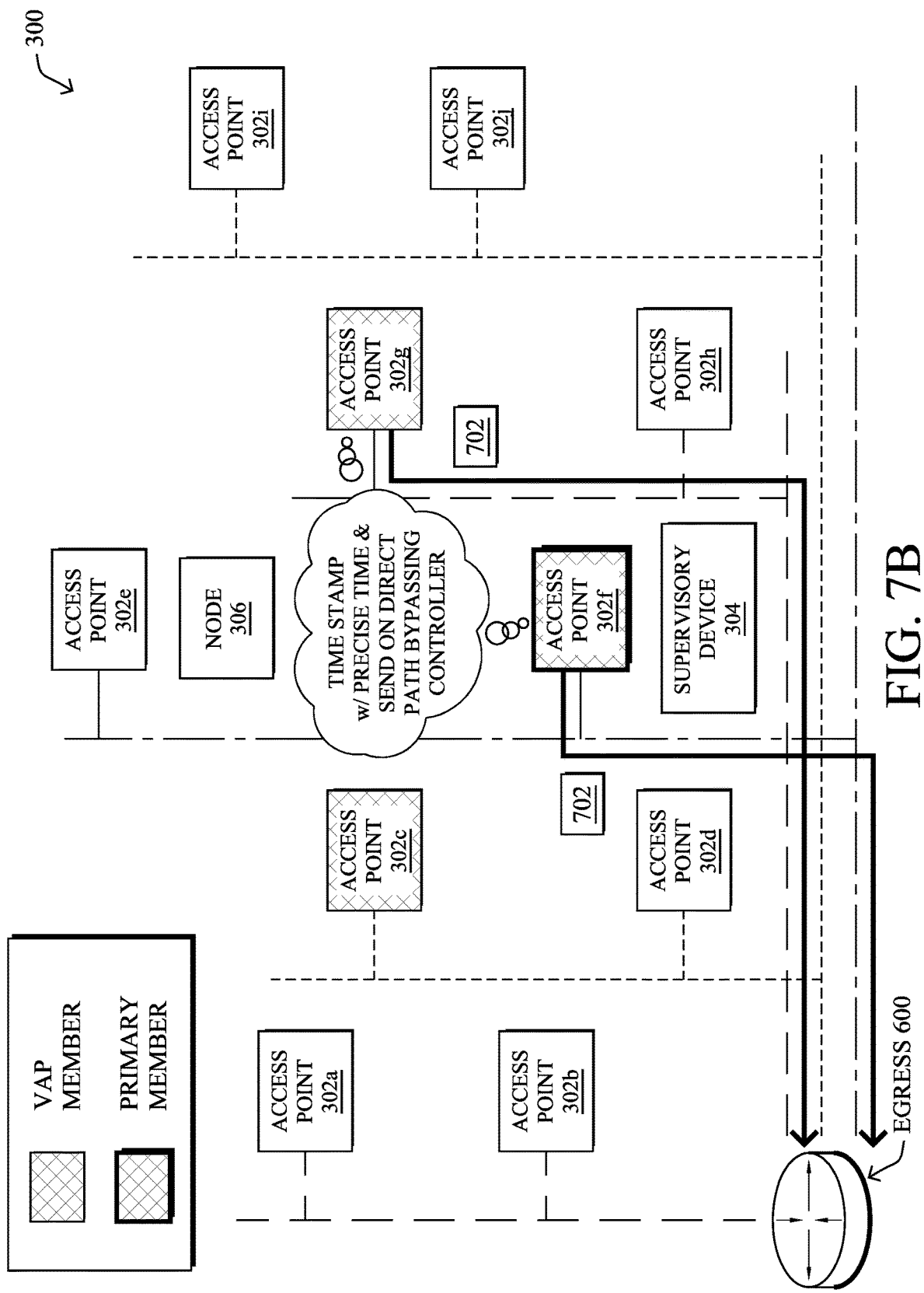

FULL PATH DIVERSITY FOR VIRTUAL ACCESS POINT (VAP) ENABLED NETWORKS

RELATED APPLICATION

This application is a continuation application of U.S. patent application Ser. No. 15/599,767, filed May 19, 2017, which claims priority to U.S. Provisional Patent Appl. No. 62/415,391, filed on Oct. 31, 2016, both entitled FULL PATH DIVERSITY FOR VIRTUAL ACCESS POINT (VAP) ENABLED NETWORKS, by Thubert, et al., the contents of each of which are incorporated herein by reference.

TECHNICAL FIELD

The present disclosure relates generally to computer networks, and, more particularly, to full path diversity for virtual access point (VAP) enabled networks.

BACKGROUND

The Internet of Things (IoT) is the internetworking of devices or objects (a.k.a., "things", e.g., sensors, actuators, nodes, vehicles, etc.) that collect and exchange data, control objects, and process data. Many IoT networks are formed on low-power lossy networks (LLNs), and utilize carrier sense multiple access with collision avoidance (CSMA/CA) techniques. CSMA/CA, notably, is a communication technique that uses carrier sensing, where nodes attempt to avoid collisions by transmitting only when the channel is sensed to be "idle."

In general, deterministic routing concerns ensuring that messages (e.g., packets) definitively arrive at a destination at a specific time or within a specified time range. However, implementing determinism in hub-and-spoke IoT models, particularly with CSMA/CA, faces a litany of drawbacks, such as overwhelming a server with multiple copies of traffic, excessive delay, surges in latency, and unacceptable frame loss.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4B illustrate an example of the operation of a VAP;

FIGS. 7A-7C illustrate examples of access points in a VAP mapping sending duplicate copies of a message received from a node;

DESCRIPTION OF EXAMPLE EMBODIMENTS

Overview

Figure 1:
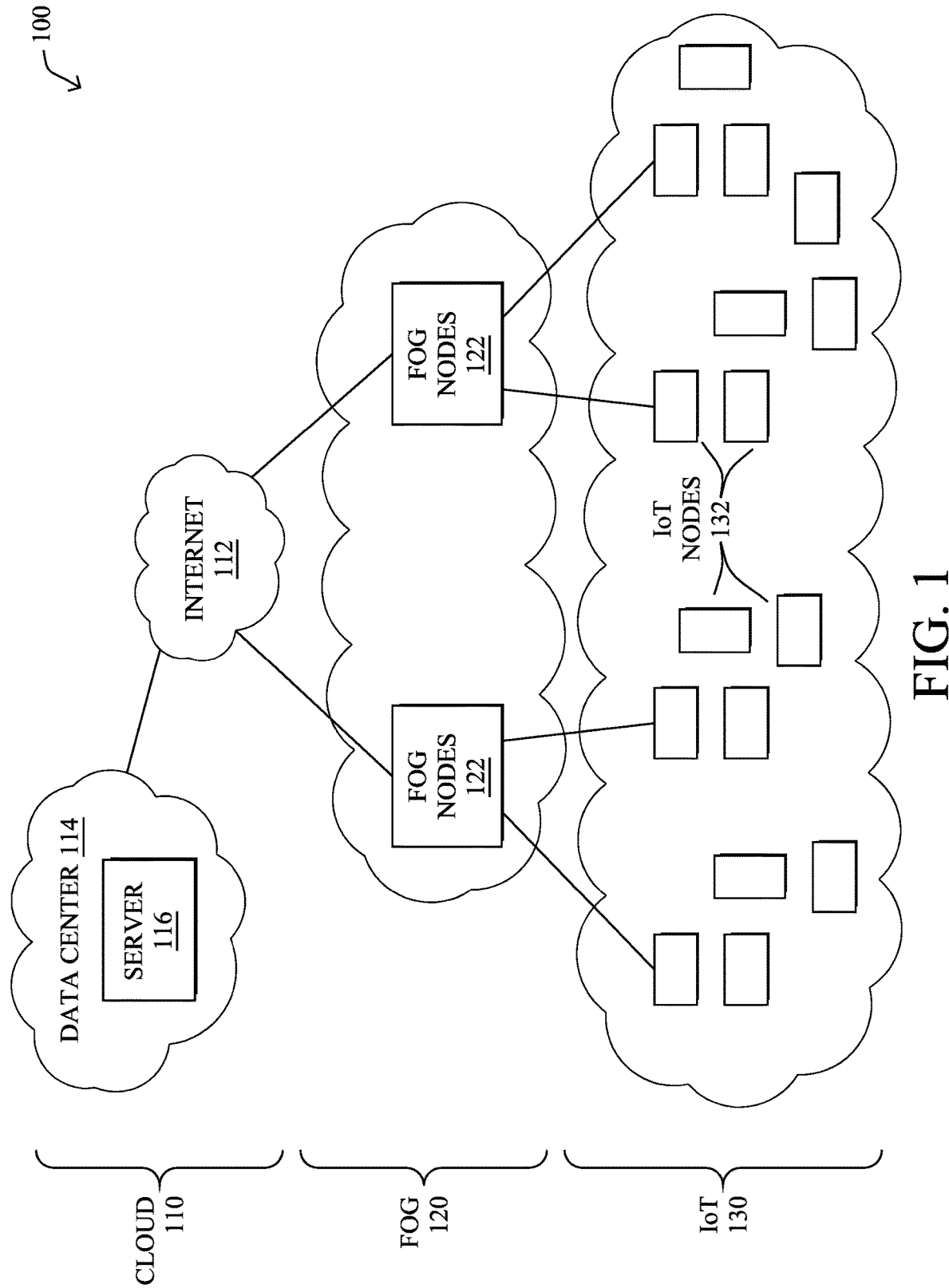
FIG. 1 illustrates an example communication network.

According to one or more embodiments of the disclosure, a supervisory device in a network assigns different access points in the network to different access point groupings. Each of the different access point groupings uses a different network path to communicate with a given endpoint in the network. The supervisory device selects at least one of the access points in each of the different access point groupings for mapping to a virtual access point (VAP) for a node in the network as part of a VAP mapping. The supervisory device instructs the selected access points to form a VAP for the node. The node treats the access points in the VAP mapping as a single access point for purposes of communicating with the network.

In further embodiments, an access point in a network receives an instruction to form a virtual access point (VAP) for a node. Access points in the network mapped to the VAP as part of a VAP mapping are selected by a supervisory device from different access point groupings that use different network paths to communicate with a given endpoint in the network. The node treats the access points in the VAP mapping as a single access point for purposes of communicating with the network. The access point receives a communication from the node and adds deterministic networking information to the received communication. The access point sends the communication with the deterministic networking information to the endpoint, wherein the endpoint drops duplicate copies of the communication received from the access points in the VAP mapping based in part on the received deterministic networking information.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc . . . ), PLC protocols, or other shared-media protocols where appropriate. In this context, a protocol consists of a set of rules defining how the nodes interact with each other.

Figure 2:
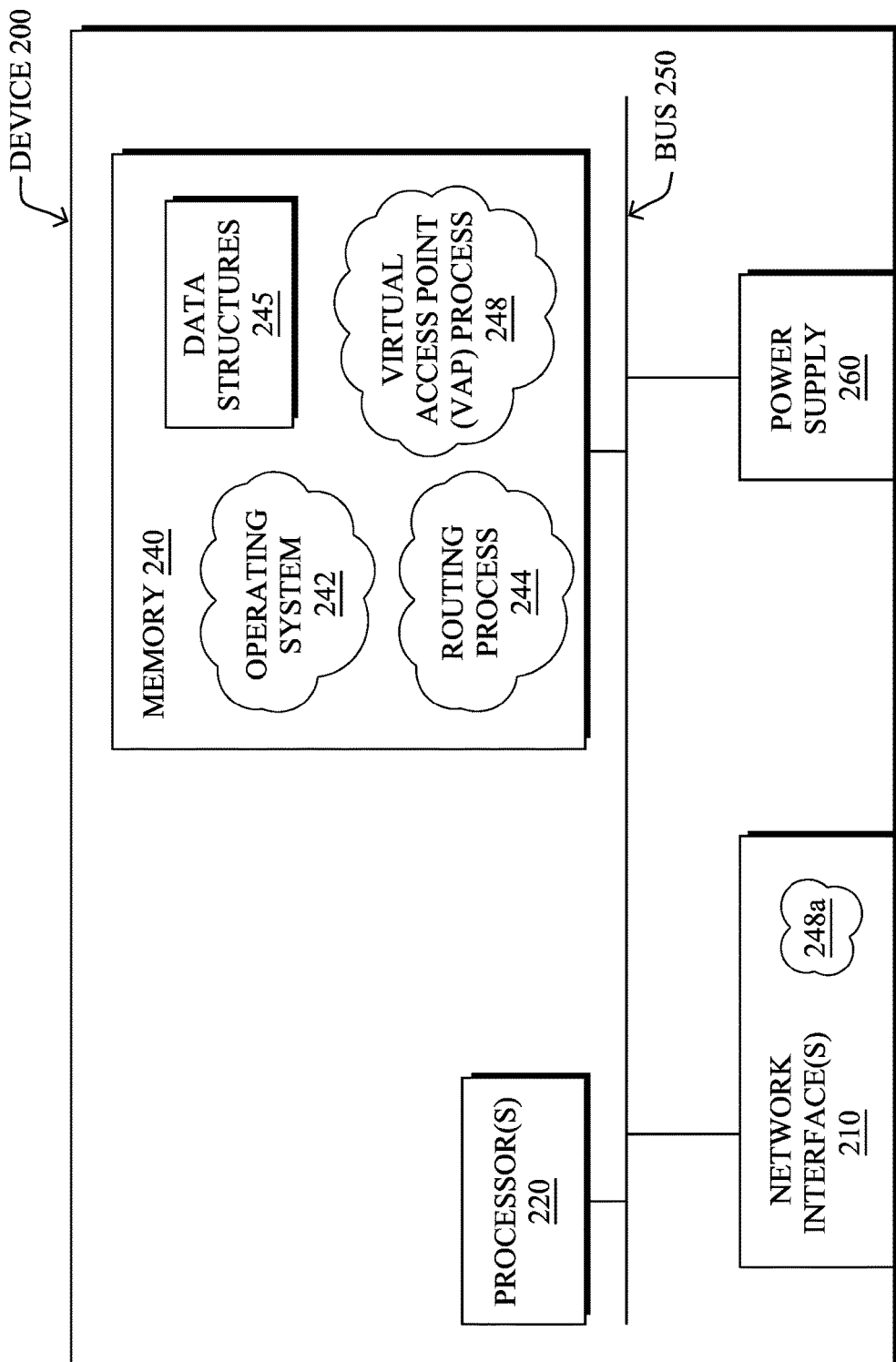
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise routing process/services 244 and an illustrative virtual access point (VAP) process 248, as described herein. Note that while VAP process 248 is shown in centralized memory 240, alternative embodiments provide for the process to be specifically operated within the network interfaces 210, such as a component of a MAC layer (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In general, VAP process 248 includes computer executable instructions that, when executed by processor(s) 220, cause device 200 to perform operations regarding the formation, adjustment, and operation of a VAP within the network. These operations are described in greater detail below. In some embodiments, process 248 may employ any number of machine learning techniques, to perform these operations. In general, machine learning is concerned with the design and the development of techniques that receive empirical data as input (e.g., data regarding the performance/characteristics of the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, process 248 can use the model M to classify new data points, such as information regarding the performance/characteristics associated with an established VAP or its underlying APs, to adjust the VAP, accordingly. Often, M is a statistical model, and the cost function is inversely proportional to the likelihood of M, given the input data.

In various embodiments, VAP process 248 may employ one or more supervised, unsupervised, or semi-supervised machine learning models to analyze traffic flow data. Generally, supervised learning entails the use of a training dataset, which is used to train the model to apply labels to the input data. For example, the training data may include sample network data that may be labeled simply as representative of a "good connection" or a "bad connection." On the other end of the spectrum are unsupervised techniques that do not require a training set of labels. Notably, while a supervised learning model may look for previously seen network data that has been labeled accordingly, an unsupervised model may instead look to whether there are sudden changes in the performance of the network and/or the VAP. Semi-supervised learning models take a middle ground approach that uses a greatly reduced set of labeled training data.

Example machine learning techniques that process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly labeled a connection as bad. Conversely, the false negatives of the model may refer to the number of connections that the model labels as 'good,' but are, in fact, of poor quality to the user or endpoint node. True negatives and positives may refer to the number of times the model correctly classifies a connection as good or bad, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives. In some cases, process 248 may also use reinforcement learning techniques which generally act to use feedback about the ML predictions, to adjust the underlying model. For example, an indication of a false positive from an expert (e.g., a supervisory system or user) may be used to adjust the underlying model, to avoid such predictive mistakes in the future.

As mentioned above, various protocols have been established for the IoT, including, in particular, various "hub-and-spoke" models, such as Bluetooth Low Energy, DECT-Ultra Low Energy, IEEE 802.15.4 (with no meshing), and Low Power Wi-Fi. However, there is also a lack of determinism in these models due to prevalent use of carrier sense multiple access with collision avoidance (CSMA/CA) for wireless communications. Notably, deterministic networking requires that the worst-case data loss and latency should be guaranteed in a consistent fashion as multiple services are deployed on a common converged network infrastructure. This determinism is key to many applications, such as safety and process control. To complicate matters further, considering the vast amounts of devices that are currently being installed in various IoT networks, an important constraint to be placed on any solution is that changes at the end device (e.g., IoT device/thing) should not be necessary. This would also enable connection of legacy devices, thereby addressing a much wider market of applicability.

Virtual Access Point (VAP) Formation

The techniques herein introduce a methodology that can be used with existing IoT infrastructure to implement a virtual access point (VAP) that is unique to a given IoT node. In general, the VAP is a logical entity that appears to the endpoint node as a normal AP to which the node associates as normal. In practice, however, the VAP is physically distributed over a number of APs surrounding the device. In another aspect, a supervisory device in the network may control the AP membership in the VAP, such as by transferring AP membership in the network while the node moves and without requiring the node to roam. In further aspects, a machine learning model of the supervisory device may oversee the VAP and adjust the VAP mapping, accordingly. Such a machine learning model may reside in the supervisory device (e.g., controller, cloud service, etc.) in a centralized mode, or in a distributed manner across the APs. Depending on the traffic criticality, more or less of those APs may copy a given frame received from the endpoint node to the supervisory device.

Illustratively, the techniques described herein may be performed by hardware, software, and/or firmware, such as in accordance with virtual access point process 248, which may include computer executable instructions executed by processor 220 (or independent processor of interfaces 210) to perform functions relating to the techniques described herein. In particular, VAP process 248 may be a component of an IoT device, a cloud device, or any other participating device for the techniques described herein.

Specifically, according to one or more embodiments of the disclosure, a supervisory device in a network receives from a plurality of APs in the network data regarding a network availability request broadcast by a node seeking to access the network and received by the APs in the plurality. The supervisory device uniquely associates the node with a VAP for the node and forms a VAP mapping between the VAP for the node and a set of the APs in the plurality selected based on the received data regarding the network availability request. One of the APs in the mapping is designated as a primary access point for the node. The supervisory device instructs the primary AP to send a network availability response to the node that includes information for the VAP. The node uses the information for the VAP to access the network via the set of APs in the VAP mapping.

Operationally, the techniques herein specify an architecture and protocol between a supervisory device in a network (e.g., a controller, such as a network server) and a plurality of network access points (APs). The supervisory device may be configured for use with any of the technologies, noted above. Note that the techniques herein illustratively place a number of functions in the supervisory device, such as components hosting Machine Learning (ML) processes, also referred to as "learning machines") that are mostly technology-independent. In some embodiments, these processes may be implemented in a distributed manner (e.g., across different APs), in which case the collective set of APs may be viewed as the supervisory device.

More specifically, the techniques herein enable the formation and use of a VAP that appears to always be "near" an endpoint node, so that quality of transmission and PHY speed can be maintained. A VAP may be instantiated within a set of APs around the node, and the set may vary automatically under the control of the supervisory device (e.g., a controller hosting a machine learning model) within the infrastructure. Thus, the device never needs to make a decision of roaming, which is a paradigm change in Wi-Fi and other wireless networks. Also, since multiple APs can receive a same packet at a same time with unrelated probabilities, the overall chances of reception are increased and delays related to retries are reduced, thus helping with determinism.

Generally, a VAP may include any number of physical APs in the network that are placed in groups of equivalence, all using the same channel and security settings. When a node (e.g., a STA) associates with the network, the supervisory device (e.g., controller) may select a set of APs that together form a VAP for the associated node. The set may be changed as the node moves. In this way, the endpoint node may experience a constant service from the network and does not roam. For joining, the node may interact with one of the APs (e.g., a primary networking AP) and may use a unique network identifier associated with the VAP, such as a unique service set identifier (SSID), a PAN-ID, or the like, that the node uses to access the network. The supervisory device may also optimize the set of APs based on an objective function and on the observed traffic in the network. Diversity is obtained because multiple members of the VAP may receive the same packet from the node, with relatively independent chances of success.

The illustrative VAP protocol described herein also integrates well with deterministic networking (DetNet). In particular, the VAP protocol enables multiple APs to receive a packet from an endpoint node at the same time, creating a natural replication mechanism in which multiple copies of a same packet may be captured, each by a different AP participating in the VAP assigned to the node. Those APs may be connected over different networks and the packet may circulate to the router or the final destination over segregated paths. DetNet elimination may then be used to eliminate duplicate copies, if any. The VAP protocol herein also leverages various networking techniques (e.g., Wi-Fi, controllers, ML processes, etc.), to improve the user experience while maintaining compatibility with the existing network standards and existing endpoint nodes, by creating a virtual AP that is always there and always optimized so the node never tries to roam.

Figure 3A:
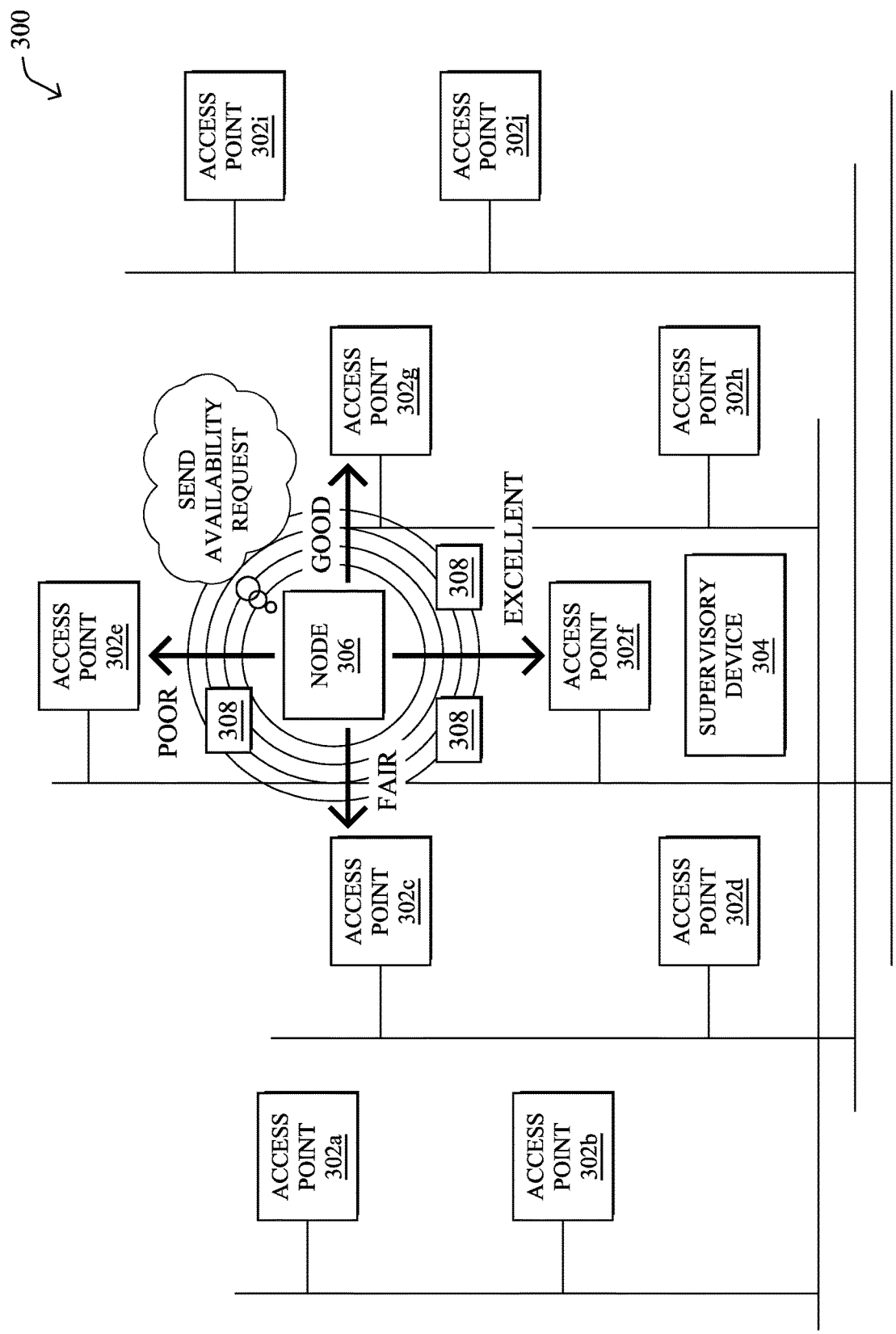
FIGS. 3A-3D illustrate an example of virtual access point (VAP) formation.

FIGS. 3A-3D illustrate an example of virtual access point (VAP) formation, according to various embodiments. As shown in FIG. 3A, assume that there exists a portion 300 of a network that includes a plurality of APs 302 (e.g., APs 302a-302j) that are located in different physical locations through an area (e.g., a building, campus, etc.). APs 302 may be in communication with a supervisory device 304 in the network, such as a wireless controller, other networking device, or, alternatively, a remote device, such as a server located in a data center or cloud computing environment.

Now, assume that a node 306 is attempting to access the network. In such a case, node 306 may broadcast a network availability request 308. The specific format of request 308 may be a function of the specific wireless protocols in use by the network. For example, in the case of 802.11 networks, availability request 308 may be a probe request. As would be appreciated, from the standpoint of node 306, the expected availability response would include an identifier for the available network, such as the SSID of the Wi-Fi network. Reception of availability request 308 by any of APs 302 may trigger the formation of a VAP for node 306, in various embodiments. In further embodiments, a VAP may also be formed at any time after node 306 associates with the network.

In many network implementations, a plurality of APs 302 may receive the broadcast network availability request 308 from node 306, with varying results. Notably, APs 302 within range of node 306 may, by virtue of receiving request 308, capture data regarding request 308, including the contents of request 308 and other characteristics of the received request 308 such as, but not limited to, a link quality indicator (LQI), a signal to noise ratio (SNR), or received signal strength indicator (RSSI), or the like. For example, as shown, AP 302f, which is physically located closest to node 306, may determine that the quality of the received request 308 is "excellent." Similarly, APs 302g, 302c, and 302e may determine that the quality of the received request 308 is "good," "fair," and "poor," respectively.

Figure 3B:
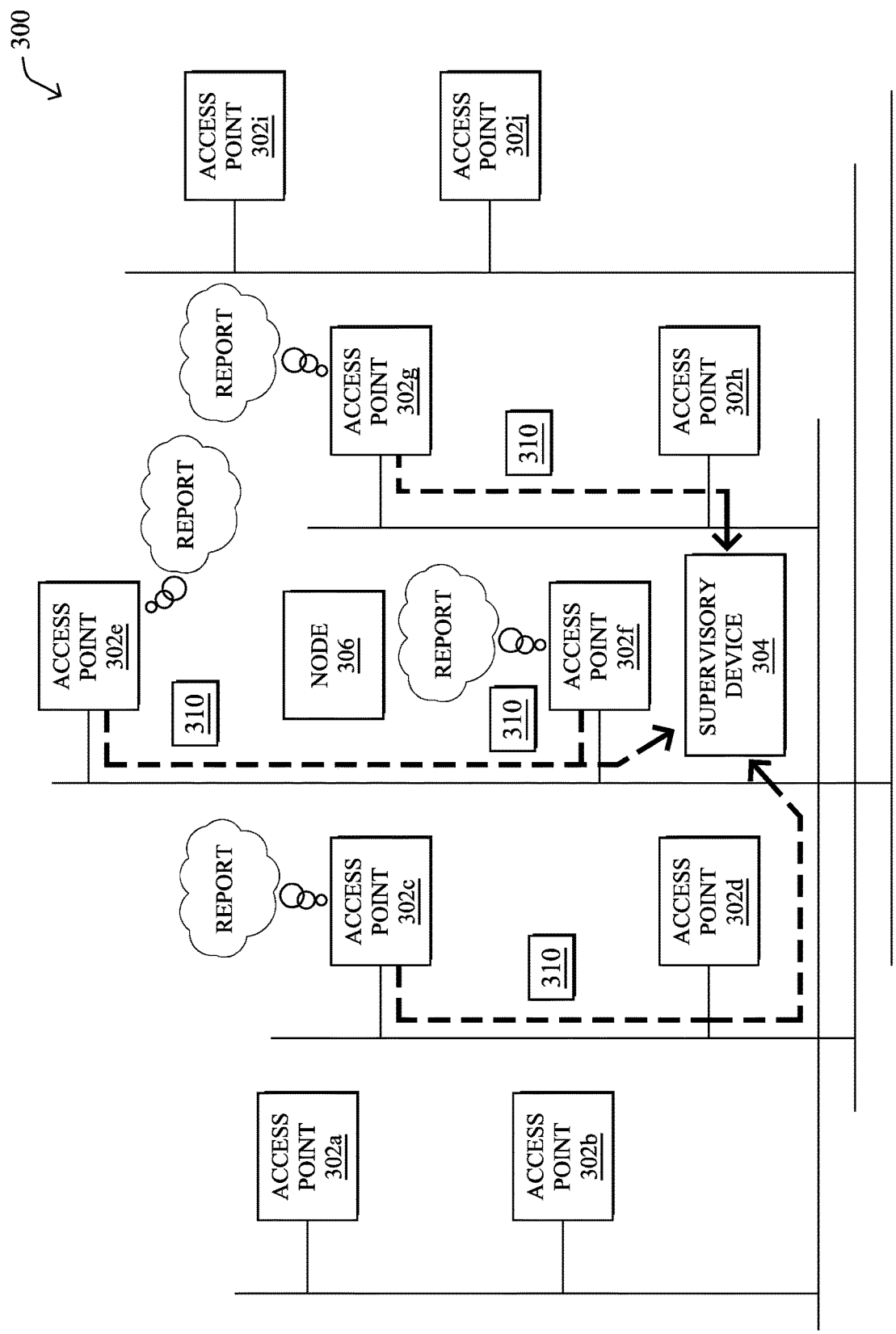

In various embodiments, rather than simply responding to request 308 with the requisite information needed for node 306 to associate with the network, the receiving APs 302 may instead report the captured data regarding request 308 to supervisory device 304. In particular, as shown in FIG. 3B, APs 302c, 302e, 302f, and 302g may send the data 310 regarding the received network availability request 308 from node 306 to supervisory device 304, thereby triggering the formation of a VAP for node 306. Data 310 may include, for example, the identity of the sending AP 302 that received request 308, a MAC address or other networking device identifier for node 306, security status information, and/or at least one metric of the quality of the communication with the node (e.g., signal strength, signal to noise ratio, signal quality, etc.).

Figure 3C:
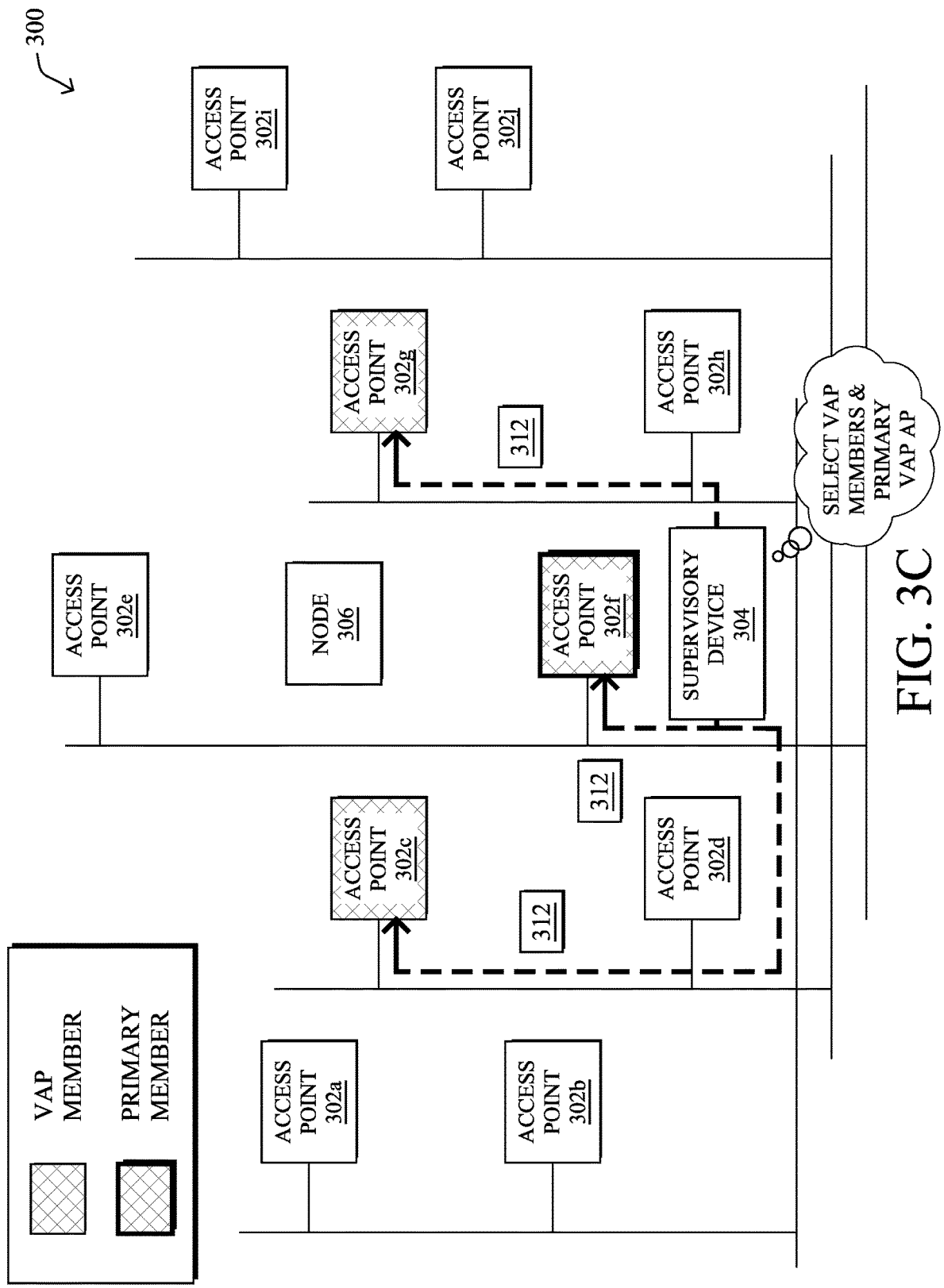

In FIG. 3C, the supervisory device 304 may create a virtual AP (VAP) that is unique to node 306. In general, the VAP may be mapped to any number of APs 306 selected by supervisory device 304 based in part on the data 310 regarding the availability request 308 received by the various APs 302. In other words, the VAP may be a logical construct that is distributed over multiple APs 302. For example, even though APs 302c, 302e, 302f, and 302g received association request 308 from node 306, supervisory device 306 may determine that the set of APs 302 in the VAP mapping for node 306 should only include APs 302c, 302f, and 302g, based on the quality of the received request 308 (e.g., AP 302e may be excluded from the VAP based on the poor quality of the received broadcast signal).

In addition to selecting the VAP member APs 302, supervisory device 304 may also designate one of the selected APs 302 as the primary AP 302 for the VAP. For example, based on data 310 regarding the availability request 308 sent by node 306, supervisory device 304 may determine that AP 302f has the best signal quality and should be the primary AP within the VAP for node 306. In turn, as shown in FIG. 3C, supervisory device 304 may send instructions 312 to the selected APs 302c, 302f, and 302g that include information regarding the VAP. For example, instructions 312 may instruct the selected APs 302c, 302f, and 302g to belong to the VAP for node 306, as identified initially by MAC address of node 306 and, as soon as it is available, by security token, and/or other cryptographic methods.

To implement the VAP in the network, supervisory device 304 may employ a VAP protocol, in order to exchange configuration and data packets with the APs 302. This protocol may be seen as an extension to existing protocols, such as Lightweight Access Point Protocol (LWAPP) and Control and Provisioning of Wireless Access Points (CAPWAP), or may be specified as a new protocol. For example, the exchanges of data 310 and instructions 312 may use this VAP protocol.

Figure 3D:
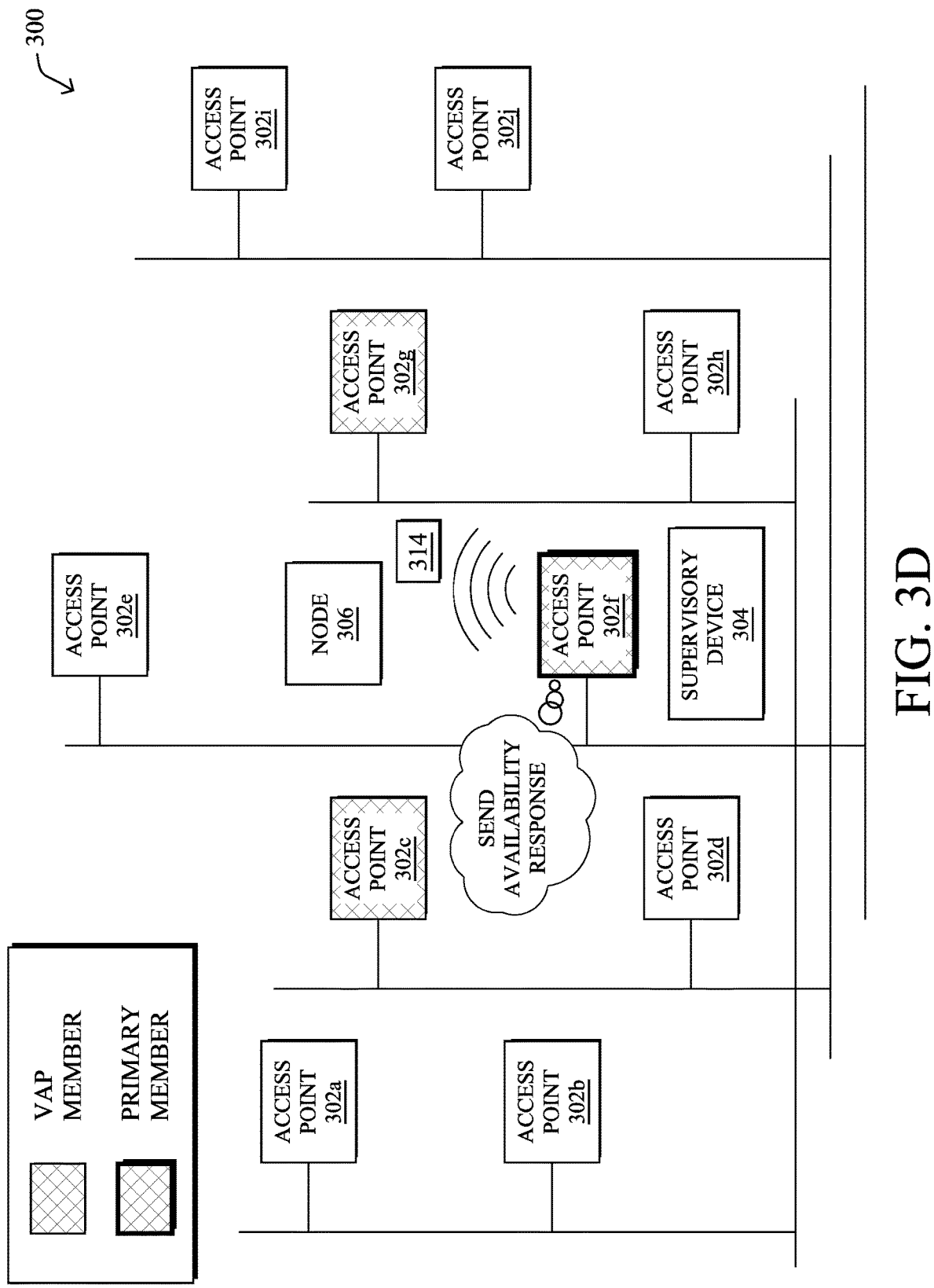

As shown in FIG. 3D, once the VAP has been generated and APs 302c, 302f, and 302g selected for mapping to the VAP, the primary AP 302f may send a network availability response 314 back to node 306. For example, response 314 may be a unicast probe response that has the same information as a beacon frame. In various embodiments, response 314 sent by primary AP 302f to node 306 may also include a unique network identifier associated with the VAP. For example, response 314 may include an SSID or PAN-ID generated by supervisory device 304 specifically for use with the VAP. In turn, node 306 may use the received response 314 to associate with the network, as it would under normal conditions. From the standpoint of node 306, it is associating with the network normally via AP 302f and may remain unaware of the existence of its associated VAP.

Figure 4A:
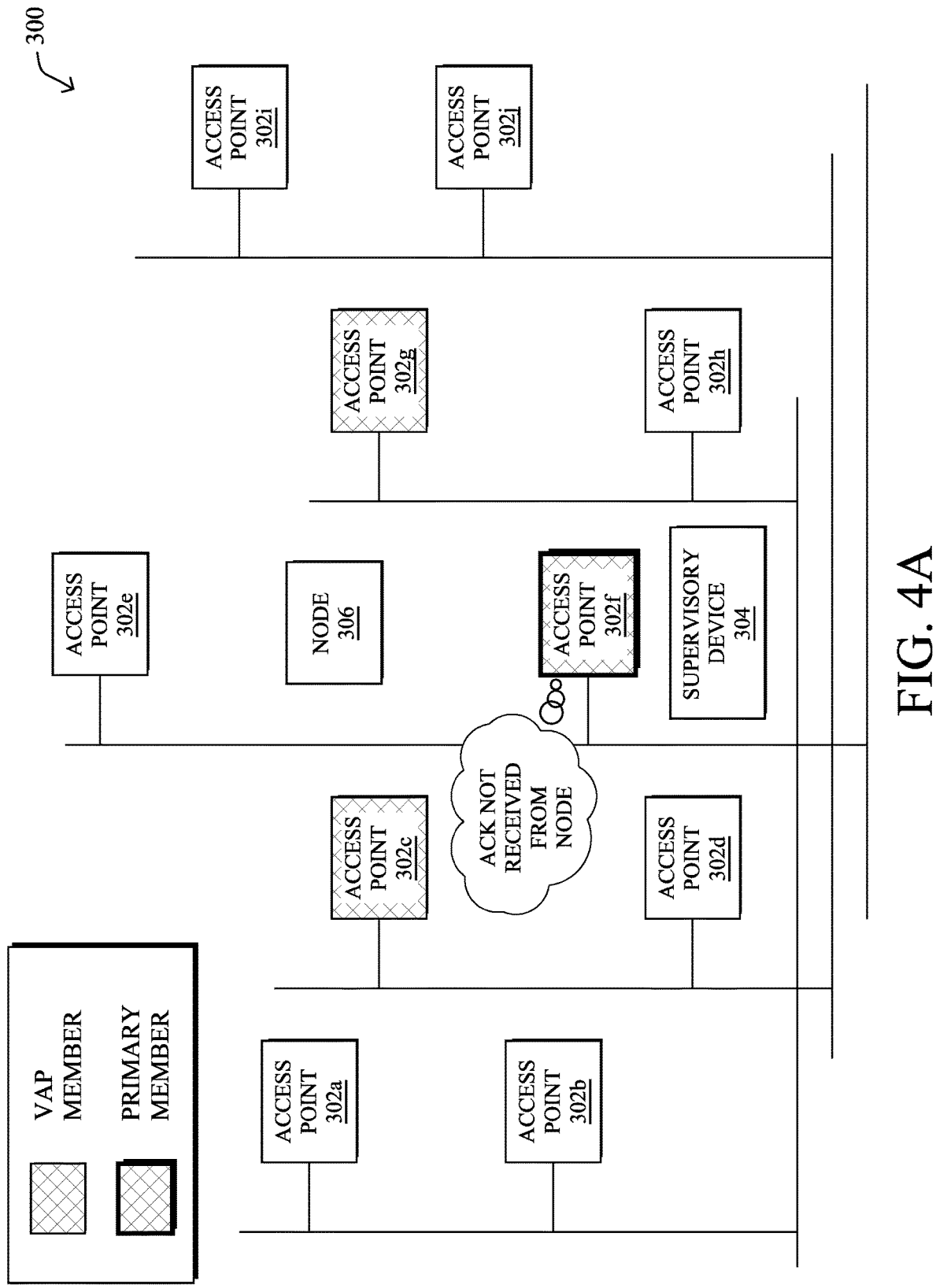

FIGS. 4A-4B illustrate an example of the operation of a VAP after formation, according to various embodiments. Continuing the examples of FIGS. 3A-3D, when forming the VAP for node 306, supervisory device 304 may also build an ordered list of the other APs 302 in the VAP mapping and conveyed to the selected APs 302 via instructions 312. In general, the ordered list may be used to add special diversity and improve the chances of a successful reception versus a retry from a given AP 302 that has already failed once. For example, as shown in FIG. 4A, assume that primary AP 302f has sent a message to node 306, but that message has not been acknowledged by node 306. Under normal circumstances, AP 302*f* would then attempt to retry sending the message again to node 306. However, according to various embodiments, as shown in FIG. 4B, AP 306*g* may instead resend the message 402 to node 306. Because the resend is sent from a different AP, the added spatial diversity increases the chances that the resent message 402 is received and acknowledged by node 306.

In various embodiments, learning machines may play a key role in the assignment of APs to a VAP and/or in the adjustment of an existing VAP. For example, such a learning machine may be trained to select APs 302 for inclusion in a given VAP based on a location estimation for the corresponding node (e.g., from data 310) and/or the desired optimization for the traffic expected from that type of node. For example, the location of node 306 may be derived from a Time Difference of Arrival value (TDOA or DTOA) and/or using triangulation between different APs 302.

Such a traffic optimization may be based on a history of traffic for the type of node, in some cases. As would be appreciated, the type of approach taken by the learning machine(s) may also vary with the specific objective function for the traffic and node type. For example, assume that node 306 is a particular type of telepresence device and that video traffic from similar devices has required a certain degree of network performance (e.g., in terms of drops, delay, jitter, etc.). In such a case, the learning machine may use its model for this node type, as well as any necessary metrics from the APs 302 in the network, to select an appropriate VAP mapping to satisfy the objective function. Note that the objective function will also dramatically influence the set of metrics to be gathered from APs after the scanning phase but also during the lifetime of a VAP. Indeed, according to the objective function, the set of required features, in machine learning terms, may vary, and the frequency of AP selection for the VAP will also vary.

Figure 5A:
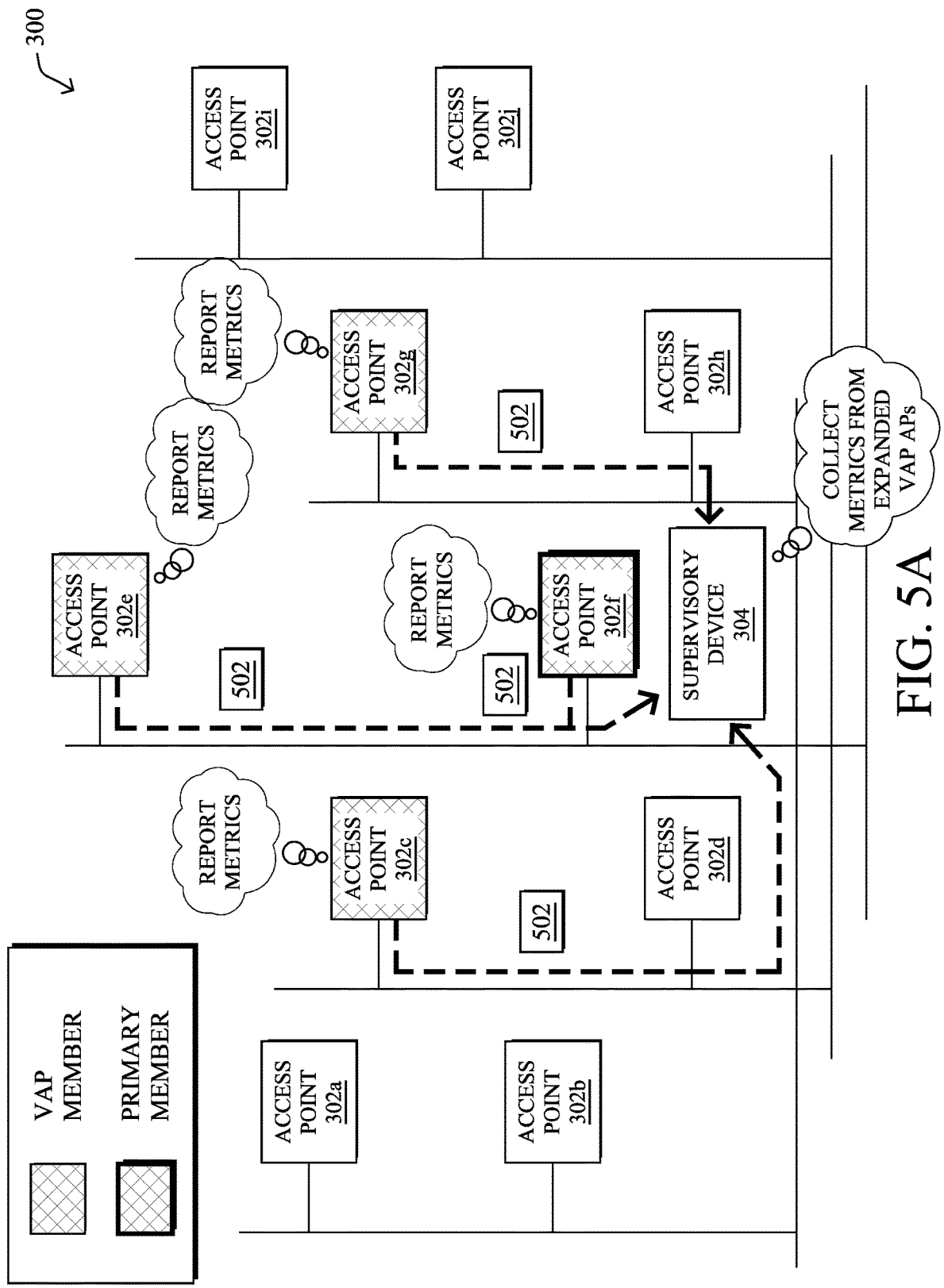
FIGS. 5A-5C illustrate an example of adjusting a VAP mapping.
Figure 5B:
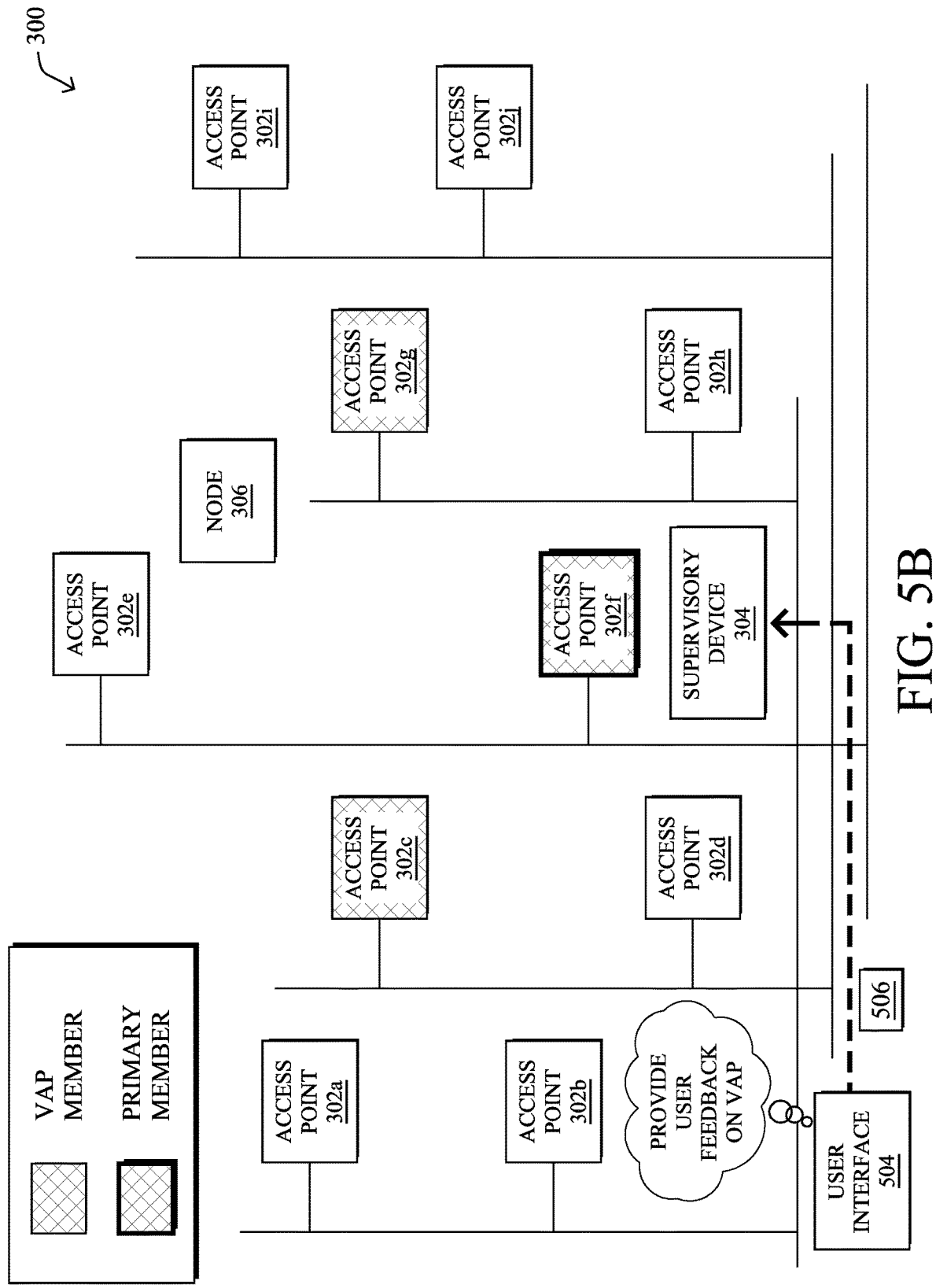
Figure 5C:
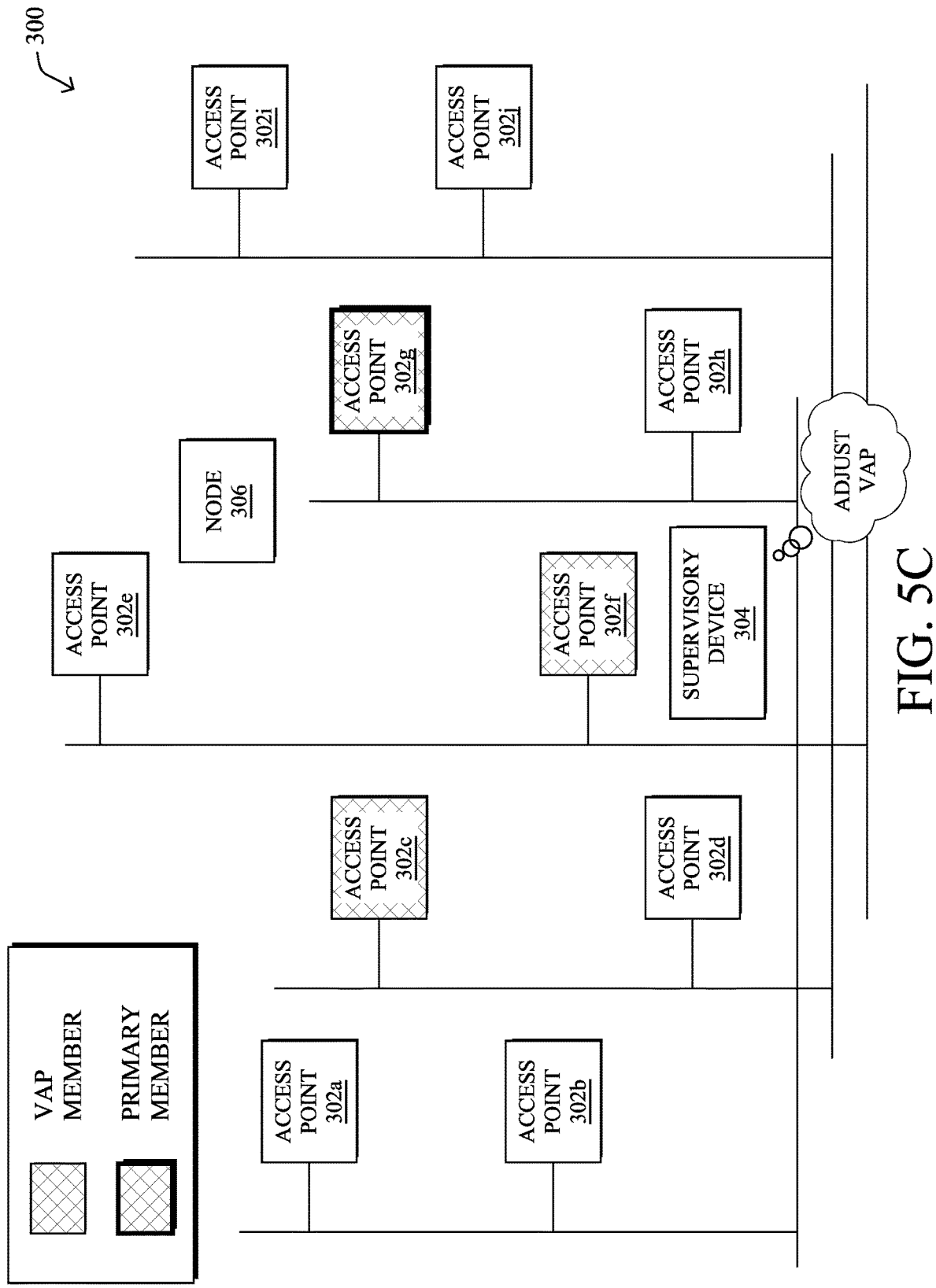

FIGS. 5A-5C illustrate an example of adjusting a VAP mapping, according to various embodiments. Even after formation of a VAP for a given node, supervisory device 304 may continue to monitor and adjust the VAP, in order to ensure that the objective function of the corresponding machine learning model for node 306 continues to be met. To do so, the following message types are introduced herein as part of the VAP protocol:

1.) VAP commands sent by the learning machine to APs 302, to gather metrics of interest (e.g., network characteristics/statistics), report the VAP group membership, etc.

2.) VAP metrics sent by the responding APs 302 to the learning machine and used by the objective function to compute the VAP membership (e.g., based on signal/noise ratio, signal strength, etc.).

3.) VAP stats reports sent by APs 302 to the learning machine and used to evaluate the VAP efficiency. Such stats reports may be used to gather statistical data used by the learning machine to determine the "efficiency" of the VAP group, which can be used by the learning machine to consistently adjust the VAP according to an objective function.

4.) Learning machine stats sent by learning machine to a user interface, to report objective function efficiency results.

In various embodiments, for purposes of collecting network metrics/characteristics and VAP stats from APs 302, supervisory device 304 may occasionally increase or otherwise adjust the APs in the VAP mapping. For example, as shown in FIG. 5A, supervisory device 304 may include AP 302*e* in the VAP mapping for purposes of data collection after formation of the VAP (e.g., via an instruction 312, even though AP 302*e* was not included in the original VAP mapping. This allows AP 302*e* to collect and report information that would not otherwise be possible using the original APs of the VAP. For example, by changing the set of APs, the learning machine can change the TDOA listeners and optimize the distance estimation, e.g., by adding APs while doing a measure, or triangulating between different sets of APs. Such collected information 502 may be reported to supervisory device 304, either on a push or pull basis. After the data collection, supervisory device 304 may opt to revert the VAP mapping back to its previous membership or make further adjustments to the AP memberships, accordingly.

As shown in FIG. 5B, supervisory device 304 may also convey data regarding the performance of the VAP (e.g., the objective function, etc.) to a user interface 504 for review by a user. In some embodiments, the learning machine may also use reinforcement learning to adjust its model for node 306 and make changes to the VAP mapping, accordingly. In such a case, the user of interface 504 (e.g., an admin device, etc.) may provide feedback 506 to the learning machine about the VAP efficiency, which is then used by the LM to adjust the strategy adopted to compute the VAP mapping.

Based on the captured network characteristics from the APs, the performance statistics for the VAP itself, and/or user feedback, the machine learning process may adjust the VAP by changing the APs in the VAP mapping. For example, as shown in FIG. 5C, assume that node 506 has move to a new physical location and is now in closer proximity to APs 302*e* and 302*g*. In such a case, supervisory device 504 may select a new set of APs 302 for the VAP of node 306 and send out corresponding instructions to the APs. Notably, as shown, supervisory device 304 may select a new set of APs for the VAP of node 306 that includes APs 302*e*, 302*f*, and 302*g*, with 302*g* now designated as the primary AP.

Thus, the generated VAP may add spatial diversity to any CSMA/CA LLN, in a manner somewhat akin to that of the LoRa model. However, in contrast to the techniques herein, LoRa uses different MAC operations and does not support the faster speeds of the components (e.g., PHY) used in today's IoT network devices. Additionally, LoRa does not support the association process, the use of identities (e.g., PAN-ID or SSID), and the automatic repeat request (ARQ) process for acknowledgement and retry, which are supported using the techniques herein. Further, LoRa does not support multicast communications, either.

Full Path Diversity for VAP-Enabled Networks

The techniques herein are directed towards deterministic networking, particularly for use on CSMA/CA networks. The techniques above improve the medium access delay, reduce the frame loss, and help control the latency surges that are induced by the CSMA/CA MAC operation. But there is no coupling with the operations that are being worked on in Deterministic Networking. In particular, in order to be fully relevant for operation technology (TO) applications, the networking solution must be resilient to network conditions such as packet loss, broken links, and node failures. Network reliability is a key component of the overall determinism objective.

Redundancy through duplication and elimination is one of the main features in deterministic networking, and it is used in OT networks to increase the reliability of networks and meet the stringent requirements in term of packet loss. In some cases, redundancy can be implemented using the Parallel Redundancy Protocol (PRP). PRP makes use of a specific box (REDBOX) to do the packet duplication and packet elimination in a PRP network. At least two REDBOXes are needed to achieve the functionality. In some cases PRP could be implemented in the node, the switch, and the destination itself, avoiding the use of REDBOX. However, PRP also has a number of potential shortcomings:

PRP requires either the use of a REDBOX facing the end device or the implementation of the protocol from the end device itself.

PRP also defines specific headers to be inserted in the frame.

Considering the huge numbers of IoT devices already shipped, requiring a change to the MAC headers to transport PRP is out of question. Also, since the most lossy links in the end to-end path to the application is the LLN to which the device is connected, placing a REDBOX at the AP would not protect the IoT flows. So PRP is definitely not the answer for deterministic IoT.

The techniques herein, therefore, enable end-to-end replication and elimination for an IoT wireless network and without the burden of approaches such as PRP. This means without inserting a REDBOX or modifying the IoT end device (STA). Rather, the techniques herein leverage the fact that wireless transmissions are broadcast by nature as the method to enable the replication for packets coming from the device. With the techniques herein, the transmission of the copies received at different APs are carried over the deterministic infrastructure over non congruent paths; the elimination of the duplicate copies is done at the egress based on the precise time of reception stamped in the packet by the receiving AP.

Said differently, one major impediment for traditional CSMA/CA based technologies in IoT applications is the lack of a feature that OT people refer to as PRP, and which is at the end of the day the full redundancy of the network function. With PRP, a packet is duplicated, the duplicate copies are sent over disjoint (e.g., non-congruent/different) paths, and if the second copy is eliminated at the egress (also sometimes called single ended redundancy). DetNet actually generalizes this model with the concept of packet replication and elimination.

Illustratively, the techniques described herein may be performed by hardware, software, and/or firmware, such as in accordance with the illustrative "Virtual Access Point (VAP)" process 248, which may include computer executable instructions executed by the processor 220 (or independent processor of interfaces 210) to perform functions relating to the techniques described herein, e.g., in conjunction with routing process 244 or other processes as appropriate. In particular, the VAP process 248 may be a component of an IoT device, a cloud device, or any other participating device for the techniques described herein.

Specifically, according to various embodiments, a supervisory device in a network assigns different access points in the network to different access point groupings. Each of the different access point groupings uses a different network path to communicate with a given endpoint in the network. The supervisory device selects at least one of the access points in each of the different access point groupings for mapping to a virtual access point (VAP) for a node in the network as part of a VAP mapping. The supervisory device instructs the selected access points to form a VAP for the node. The node treats the access points in the VAP mapping as a single access point for purposes of communicating with the network.

Operationally, the techniques herein build DetNet disjoint paths starting at the separate APs in the VAP of a node, based on the known network topology. In some embodiments, APs are placed (colored) on DetNet/TSN or disjoints L2 networks, to enable full redundancy from the device to the data consumer. The Learning Machine (LM)/Controller selects APs from the different "colors" in the same VAP and the APs use precise time to timestamp the copies they get of a same packet from the client node. For example, the APs may be synchronized to an acceptable degree of precision using a timing protocol such as the Precision Time Protocol (PTP), Network Time Protocol (NTP), or any other time synchronization protocol capable of synchronizing APs with a precision that is finer than the time it takes to transmit a small frame.

The DetNet capable controller also enforces lower speeds for critical flows so that multiple APs in the VAP get a copy of most packets. Duplicate copies are eliminated at the other end of the DetNet network based on time-stamps and source identification (e.g., by IP or MAC address, depending on the layer). On the way back, APs recognize the copies in the air based on DetNet sequencing and the second copies is sent only if the first in not acknowledged.

Figure 6A:
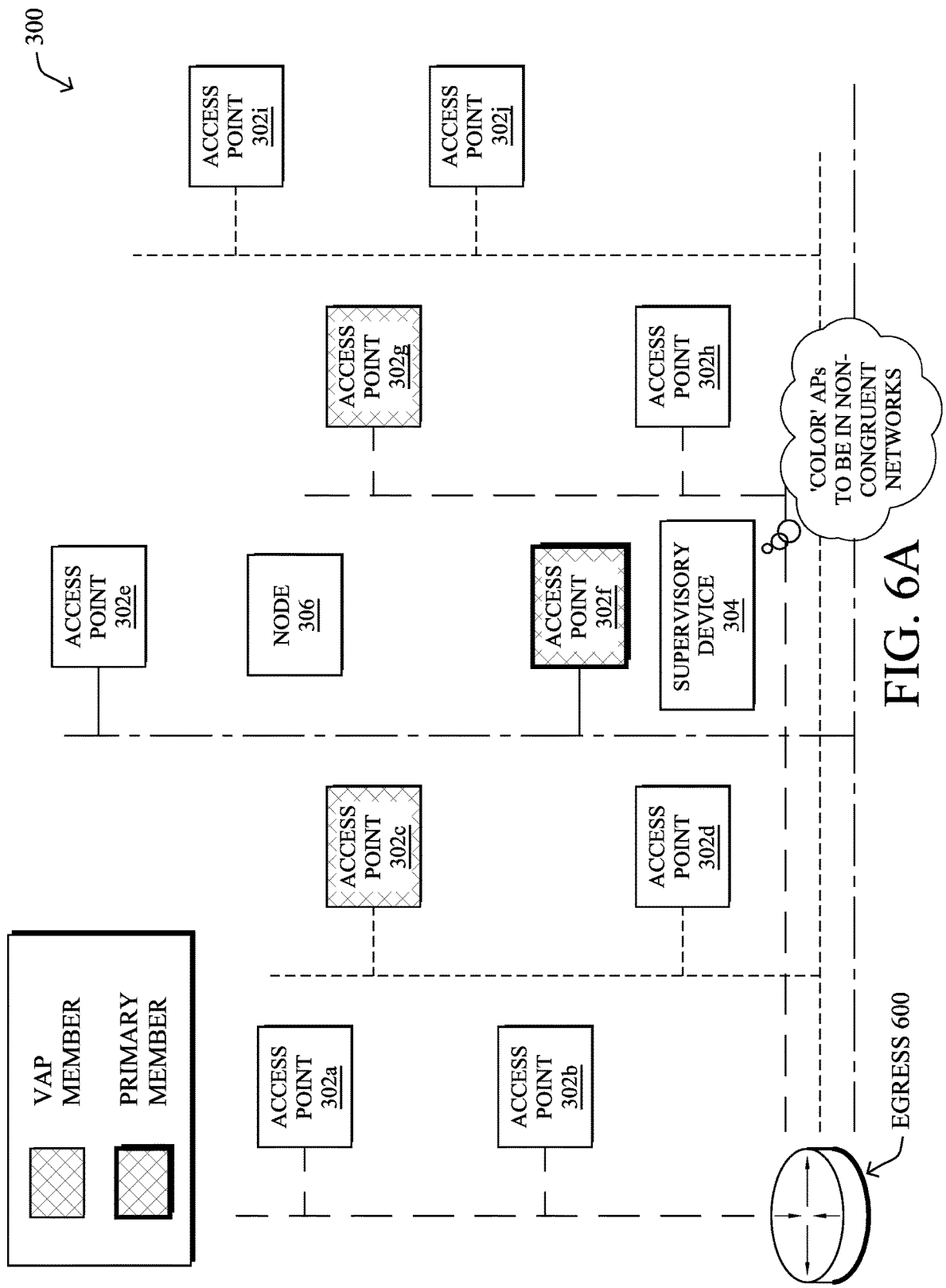
FIGS. 6A-6D illustrate an example of assigning access points to a VAP mapping to provide path diversity.
Figure 6B:
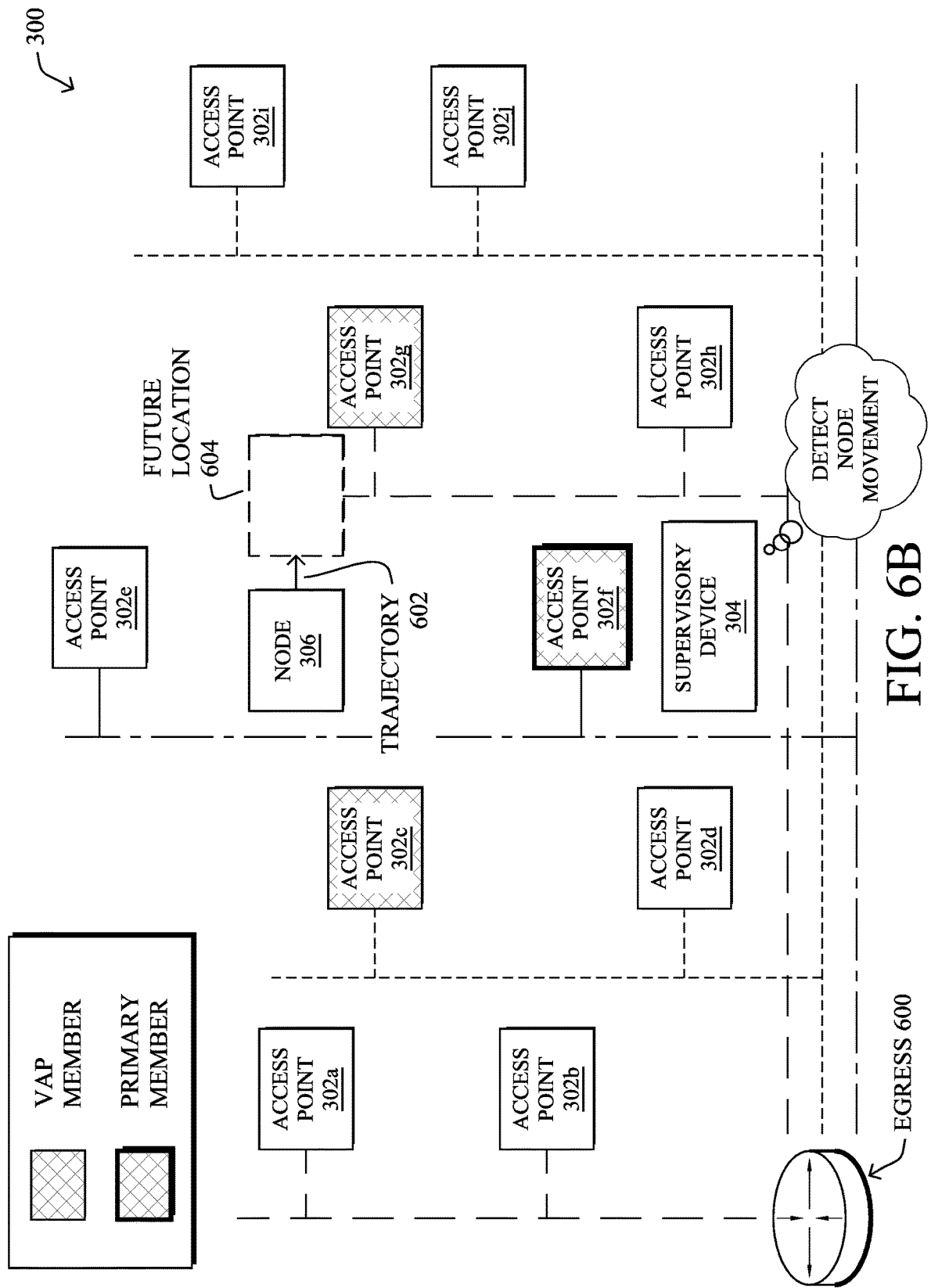

FIGS. 6A-6D illustrate an example of assigning access points to a VAP mapping to provide path diversity in a network, such as a CSMA/CA IoT network, according to various embodiments. As shown in FIG. 6A, the techniques herein modify the behavior of the VAP protocol described above by "coloring" APs so as to place them in non-congruent networks (e.g., three colors to represent three isolated portions of the network, etc.). Said different, the supervisory device 304 may use its knowledge of the topology of the network to assign the different APs 302 to different AP groupings such that the APs in any given grouping use a different network path to a given endpoint in the network, such as a DetNet egree 600. In one embodiment, supervisory device 304 may assign APs 302 to the different AP groupings based on different traffic engineering (TE) paths installed from the network.

In further embodiments, supervisory device 304 may assign APs 302 to the different AP groupings based on the APs being on different L2 network. For example, as shown, APs 302a-302b and 302g-302h may be on a first L2 network, APs 302c-302d and 302i-302j may be on a second L2 network, and APs 302e-3-302f may be on a third L2 network. In such a case, supervisory device 304 may assign these different APs to different AP groupings according to their L2 network membership. For example, APs 302a-302b and 302g-302h may be assigned to a first AP grouping, etc. These networks are then leveraged by the DetNet operations, in particular for frame replication and elimination.

In various embodiments, supervisory device 304 may select AP members for the VAP of node 306 based on their AP groupings. For example, supervisory device 304 may select one or more APs 302 from each AP groupings to be in the VAP mapping for the VAP associated with node 306. Notably, APs 302c, 302f, and 302g may each be in a different AP grouping and selected based, e.g., on their ability to communicate with node 306 and/or one another (e.g., the selected APs are within communication range of one another). By selecting the VAP members from the different AP groupings, the formed VAP affords full path diversity between node 306 and egress 600. In addition, by requiring that the APs in a VAP are able to receive packets from one another, this also avoids duplicates on the return path.

The techniques herein also alter the VAP protocol rules for new AP selection upon the detection of a device movement. For example, consider the case as in FIG. 6B whereby a movement of node 306 is detected (e.g., based on received signal strengths, triangulation, etc.) by its surrounding APs 302. In such a case, supervisory device 304 may identify a trajectory 602 and/or a future location 604 of node 306 and, in turn, adjust the VAP of node 306, accordingly. In some embodiments, supervisory device 304 may also take into account information from a scheduling/calendaring system, to identify the future location 604 of node 306. For example, if the user of node 306 has back-to-back meeting scheduled in different locations, supervisory device 304 may leverage this information to identify future location 604 and/or the path of travel of node 306 between the meetings.

Figure 6C:
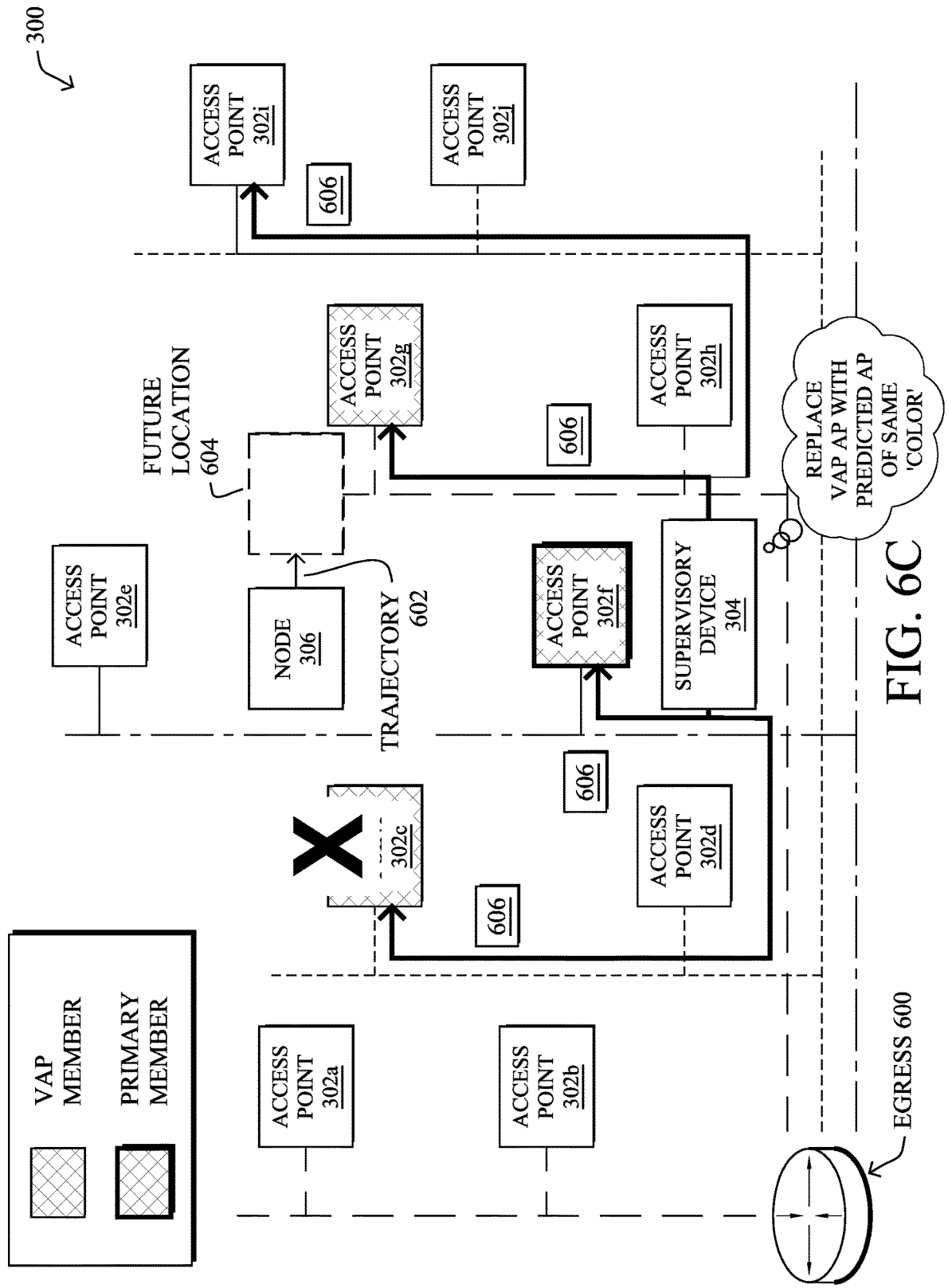
Figure 6D:
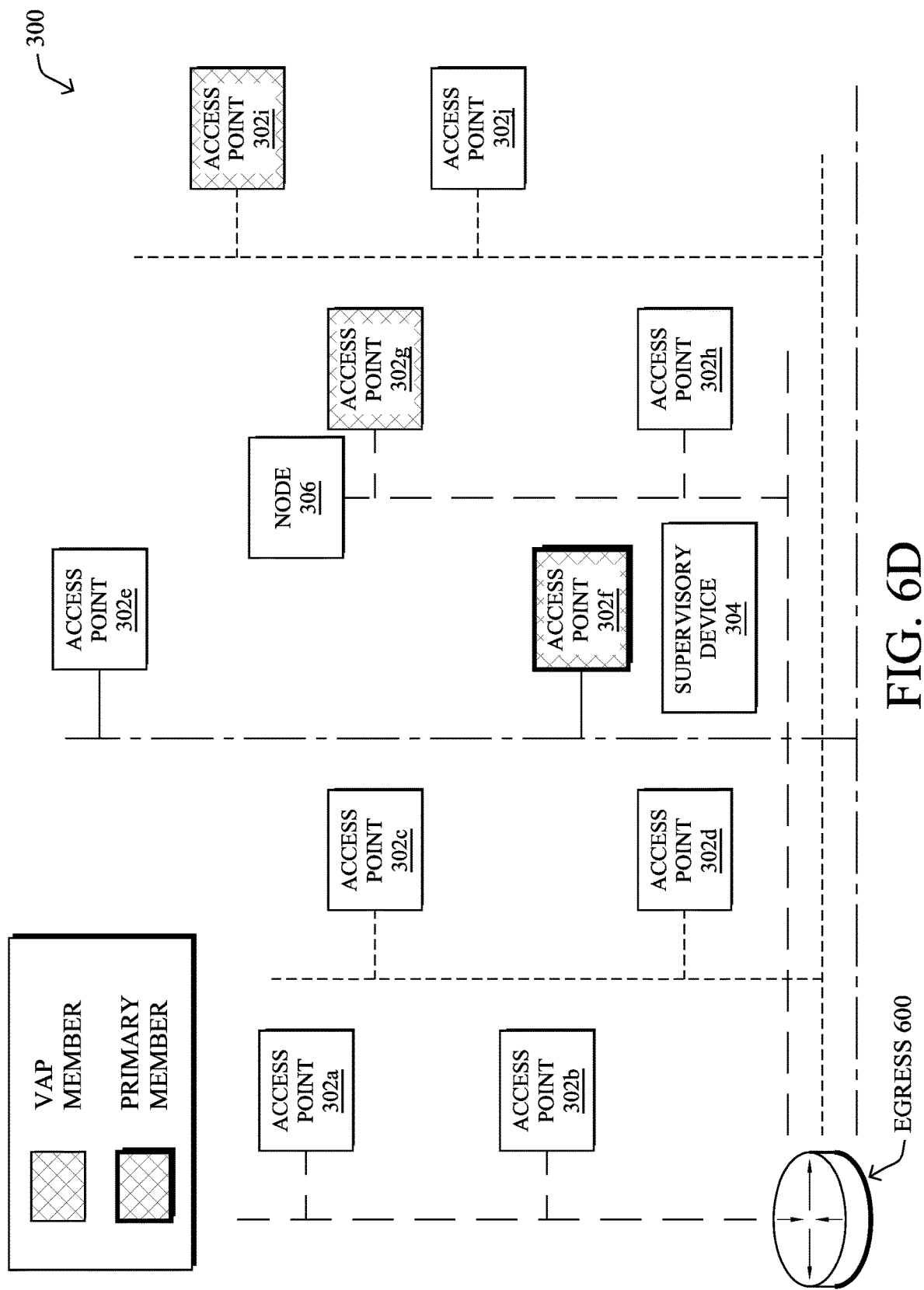

In various embodiments, supervisory device 304 may adjust the AP members in the VAP mapping when a movement of node 306 is detected. For example, as shown in FIG. 6C, supervisory device 304 may determine that AP 302*i* should be mapped to the VAP, based on its proximity to future location 604. With respect to ensuring that the path diversity is persevered when updating the VAP mapping, supervisory device 304 may require that any APs 302 removed from the VAP mapping should be replaced with another AP 302 that is in the same AP grouping as that of the removed AP. For example, if AP 302*c* is removed from the VAP mapping for the VAP of node 306, supervisory device 304 may replace AP 302*c* with AP 302*i*, as they share the same color/grouping. After determining the changes to the VAP, supervisory device 304 may then send out VAP protocol instructions 606 to the affected APs 302, to adjust the VAP mapping to instead include AP 302*i* over AP 302*c*, as shown in FIG. 6D.

Figure 7A:
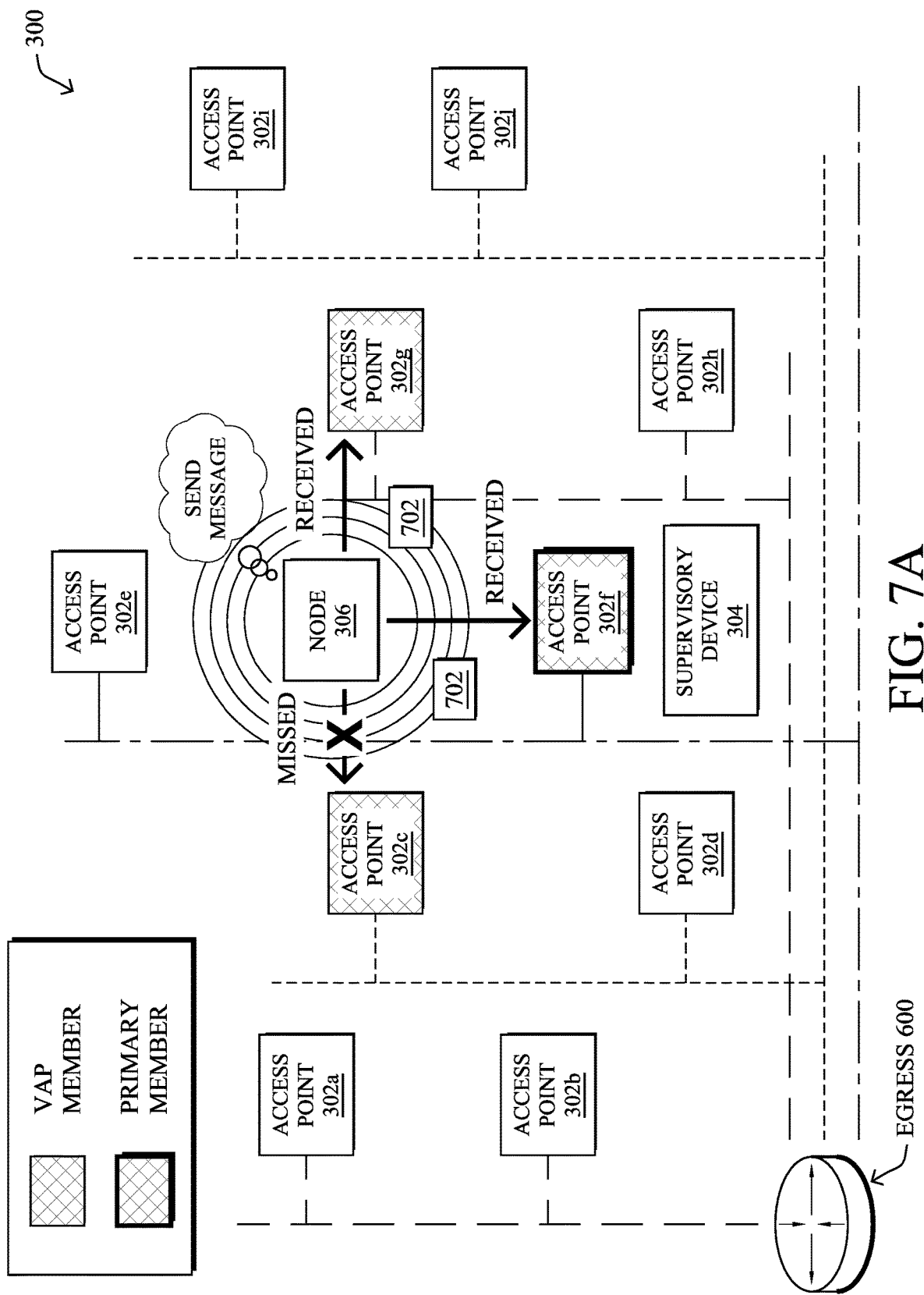
Figure 7C:
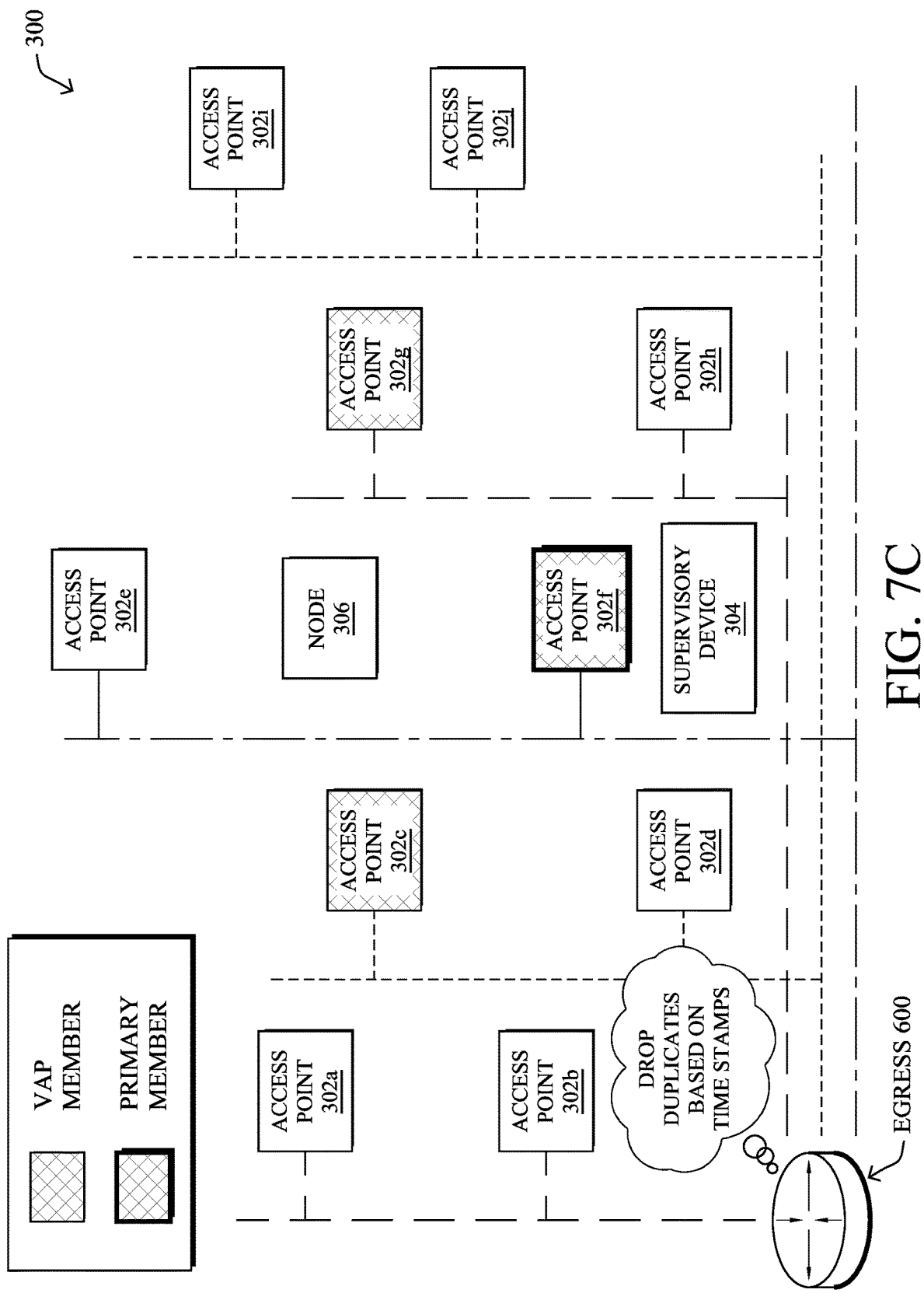

FIGS. 7A-7C illustrate examples of access points in a VAP mapping sending duplicate copies of a message received from a node, according to various embodiments. Generally, DetNet information included in the duplicate copies allows the receiving endpoint, such as the DetNet egress 600 shown, to determine that duplicates exist and eliminate the duplicates.

DetNet information that can be used to eliminate duplicates can take many different forms. In some aspects, the techniques herein use precise time (e.g., as coordinated by a time protocol, such as NTP or PTP), to allow the DetNet egress to eliminate duplicate messages received by the APs in a VAP based on timestamps applied by the VAP APs to the received messages. The VAP APs are precisely synchronized, with a precision that is finer than the time it takes to transmit a small frame. In further embodiments, the sending node itself may be aware of the use of deterministic networking functions (while potentially unaware of the use of the VAP), and may include a sequence number in its communications, thereby allowing the endpoint egress to eliminate duplicates having the same sequence number. In further embodiments, the device that acknowledges receipt of a packet from the node (e.g., an AP) may multicast or otherwise send the next message sequence number to the other VAP APs, which then apply this sequence number to the next subsequent transmission. In further embodiments, a combination of a hash of the packet and a rough timestamp may be sufficient to distinguish duplicates. In an additional embodiment, the L2 security (e.g., over the radio) in place may have a nonce to avoid two packets being the same, which can be used, e.g., in combination with a rough timestamp, the source MAC address, or the like, to uniquely identify the packet and yet have all of the receiving APs compute the same identifier so that duplicate copies sent by the APs can be eliminated. In other words, by taking the nonce from the wireless interface of the AP, each of the duplicates of the message sent onward by the VAP APs will have the same nonce or other parameter derived therefrom. Note that the term "nonce" is used generically herein to refer to any information in a frame that is unique to that frame, such that no frame is ever identical to the next. For example, in a TSCH network, the nonce could be an absolute slot number since epochal time (ASN) or, in a Wi-Fi network, could be a frame counter.

In FIG. 7A, consider the case in which node 306 sends a message/communication 702 to egress 600 via its primary VAP AP 302*f*. From the standpoint of node 306, it believes that it is only sending communication 702 to AP 302*f*, as it would in a normal STA-AP setup. However, as APs 302*c* and 302*g* are also mapped to the VAP of node 306, APs 302*c* and 302*g* may also listen for transmissions from node 306, thereby increasing the chances that at least one of the APs 302 in the VAP mapping receive message 702. For example, as shown, APs 302*f* and 302*g* may receive message 702. However, for whatever reason (e.g., interference, etc.), AP 302*c* may miss communication 702.

As shown in FIG. 7B, when an AP 302 mapped to the VAP of node 306 receives a message from node 306, the AP 302 may add deterministic networking information to the received message. For example, each of APs 302*f* and 302*g* may apply a timestamp, sequence number, or other identifier, to their respective copies of message 702. In turn, APs 302*f* and 302*g* may send the copies of message 702 with the included DetNet information towards egress 600. In some embodiments, these APs may send message 702 to egress 600 directly using a direct path that bypasses the controller/supervisory device 304.

With respect to acknowledging the received packet, the VAP APs may work in conjunction with one another, to avoid sending multiple acknowledgements. For example, supervisory device 304 may set a preferred ordering of the APs 302 mapped to the VAP such that the first AP in the ordering that receives a message from node 306 is the one to acknowledge the receipt to node 306. For example, if the primary VAP AP, AP 302*f*, first receives the packet from node 306, it may acknowledge the receipt to node 306. In more details, when a packet is received by one or more APs, those APs may multicast an indication using the VAP Protocol over the wire to the other VAP APs that they did receive the packet with whatever packet identification mechanism is used, as described above. Once they all got the packets from all the others, the AP that is the preferred one and that got the packet recognizes itself and sends the acknowledgement.

In FIG. 7C, when the endpoint egress 600 receives the duplicate copies of message 702 from APs 302*f* and 302*g*, it may eliminate the duplicate frames. Notably, by having the VAP APs 302 apply precise timestamps or other DetNet information to a given frame, this frame can then be uniquely identified in the network based on the included information (e.g., timestamp, source MAC address, security tokens associated with the frame, etc.). For example, this enables the DetNet egress 600 to determine that duplicates of the same frame from node 306 that have timestamps within a defined guard time are, in fact, identical. Based on determination that duplicates were received, egress 600 then eliminates duplicates, keeping only a single copy for further processing. Note that the guard time and the time precision depend on the technology and the speed used on the medium, and can vary across different kinds of implementations.

FIGS. 8A-8E illustrates examples of access points in a VAP mapping operating in conjunction to send a message to a node, according to various embodiments. On the return path (e.g., from egress 600 to node 306), a similar approach can be taken to ensure path diversity by sending duplicates of a message/communication 802 to each of the APs mapped to the VAP of node 306. Notably, at the ingress edge of the DetNet network, egress 600 may send duplicate copies of message 802 to APs 302c, 302f, and 302g, which are received by these APs with a slight amount of jitter. As each of the selected VAP APs are in different AP groups that use different network paths to communicate with egress 600, this ensures path diversity and increases the chance of reception within a bounded time.

If the VAP APs are selected so that they can hear one another, this allows each of the VAP APs to monitor what each other sends to node 306 and can maintain a short term memory of what messages were acknowledged by node 306. Such a memory may include the necessary parameters to discriminate a packet, typically based on the DetNet sequencing. The VAP APs also strip any DetNet information from the packet before sending to node 306, so that node 306 only sees a plain frame.

Figure 8A:
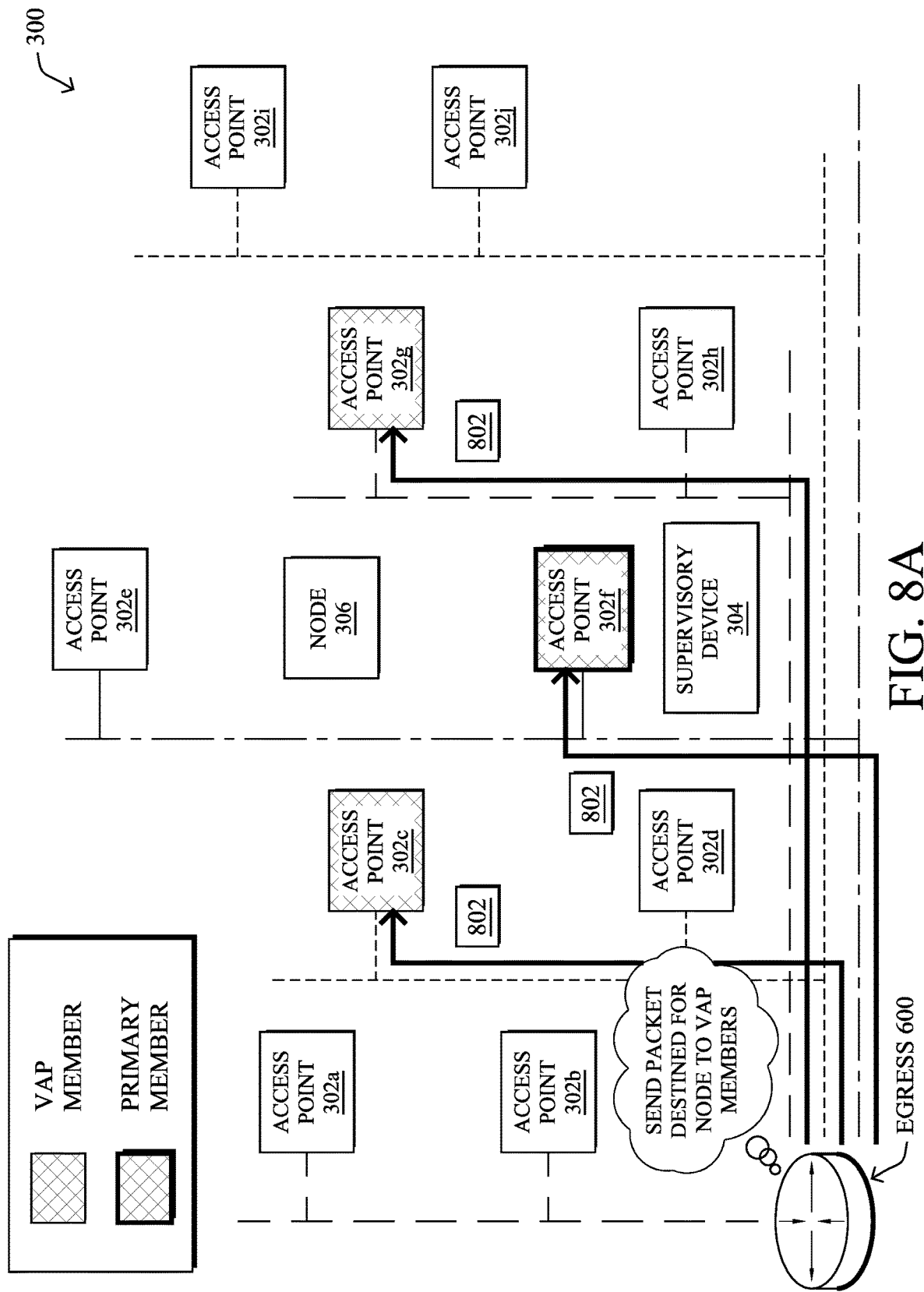
FIGS. 8A-8E illustrates examples of access points in a VAP mapping operating in conjunction to send a message to a node.
Figure 8B:
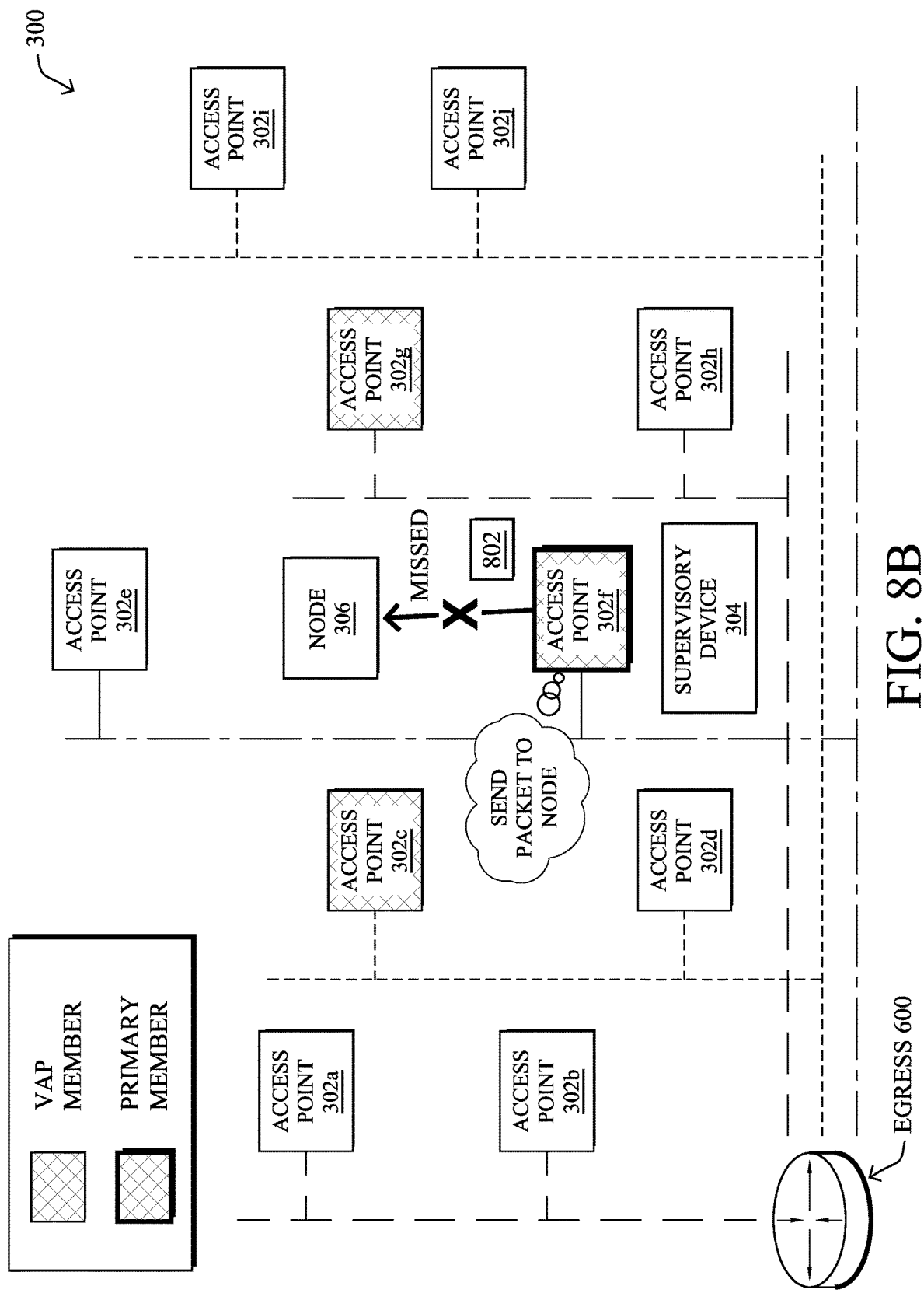

In FIG. 8B, when VAP APs 302c, 302f, and 302g receive message 802 from egress 600, they may attempt to transmit message 802 to node 306. In some cases, the ordering for these attempts may be associated with the VAP itself, such as based on the metrics collected regarding the VAP (e.g., the AP with the strongest signal with node 306 may attempt the first transmission). For example, the primary AP 302f of the VAP may be selected as the first AP in the VAP mapping to attempt transmission of message 802 to node 306. Thus, after stripping any DetNet information from message 802, AP 302f may attempt to transmit message 802 to node 306. Other orderings can also be used. For example, the first AP in the VAP mapping to receive message 802 may attempt the first transmission.

Upon a positive acknowledgement (ACK) from the node, the sender AP builds a newly defined VAP protocol multicast frame to the other VAP members over the air, indicating the DetNet parameter of the successful transmission. This is what the other APs store in short term memory. However, if there is no ACK, the waits a longer time than with the classical operation before retrying. During that time, another of the APs may have received the same frame and transmitted successfully. In that case, upon the multicast VAP protocol message over the air, the first sender drops its copy pending retry. Based on that short term memory, the APs drop duplicate packets that were already received by the node from another AP when (later) they receive their own copy over the DetNet network.

Figure 8C:
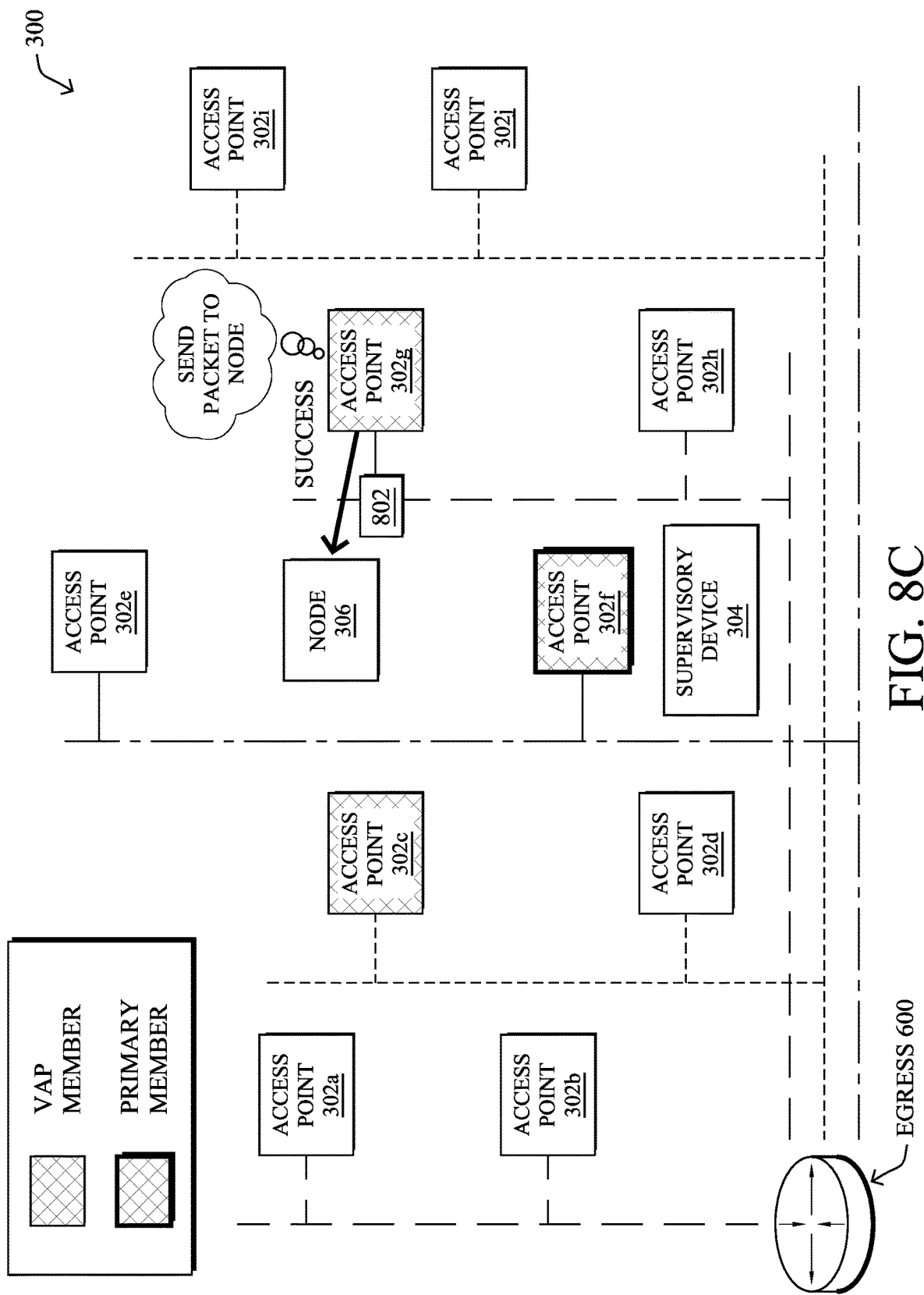

For purposes of illustration of this retry mechanism, assume that the transmission of message 802 to node 306 failed (e.g., node 306 failed to acknowledge message 802 from AP 302f), for whatever reason, as shown in FIG. 8B. Rather than AP 302f attempting retransmission, another one of the APs in the VAP mapping may instead attempt the retransmission. For example, as shown in FIG. 8C, AP 302g may listen the transmission by AP 302f and wait for an ACK that would be sent from node 306 in response to receiving message 802 from AP 302f. If not ACK is observed by the VAP APs, AP 302g may then attempt to transmit message 802 to node 306 which, for purposes of illustration, is successfully acknowledged by node 306.

Figure 8D:
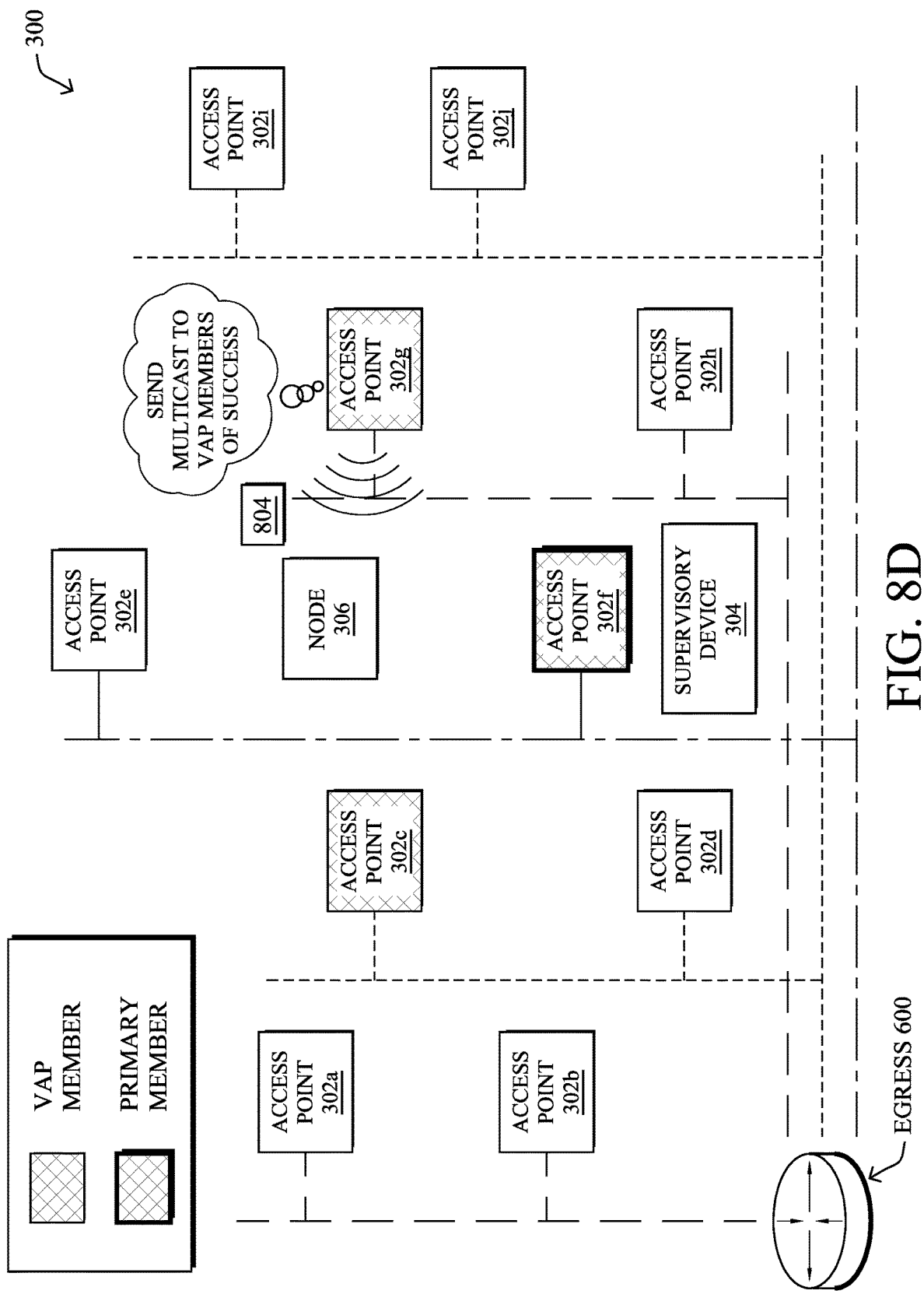
Figure 8E:
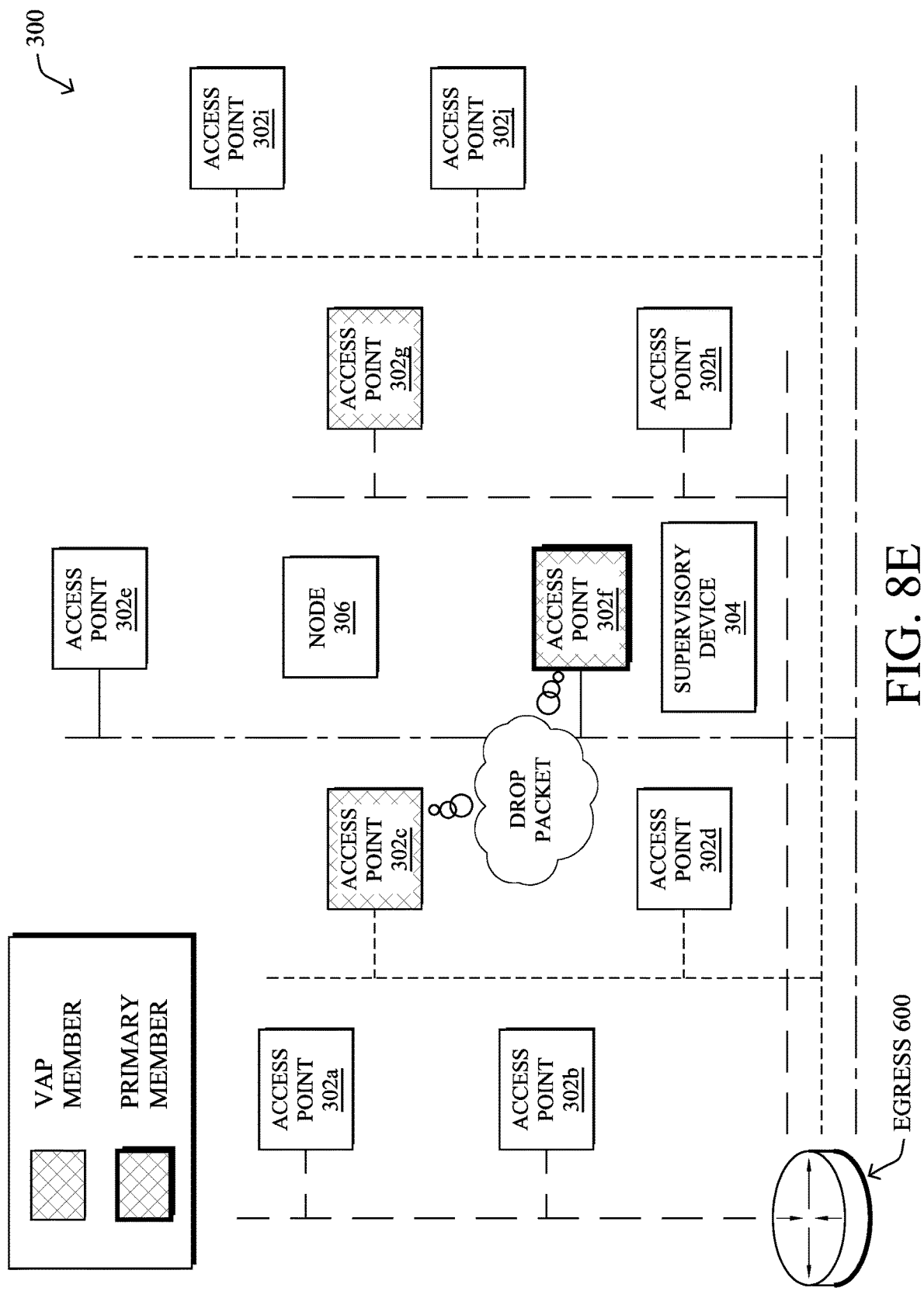

In FIG. 8D, assume that node 306 successfully received message 802 from AP 302g and acknowledged receipt of the transmission. In response to receiving an ACK from node 306 for message 802, AP 302g may send a VAP protocol multicast message 804 to the other VAP APs, APs 302c and 302f, notifying them of the successful reception of message 802 by node 306. Based on this, as shown in FIG. 8E, APs 302c and 302f can then delete message 802 from their short term memories. By having different VAP APs attempt retransmission, this helps add spatial diversity and increase the chance of reception, which is a key requirement for implementing determinism in a network.

Figure 9:
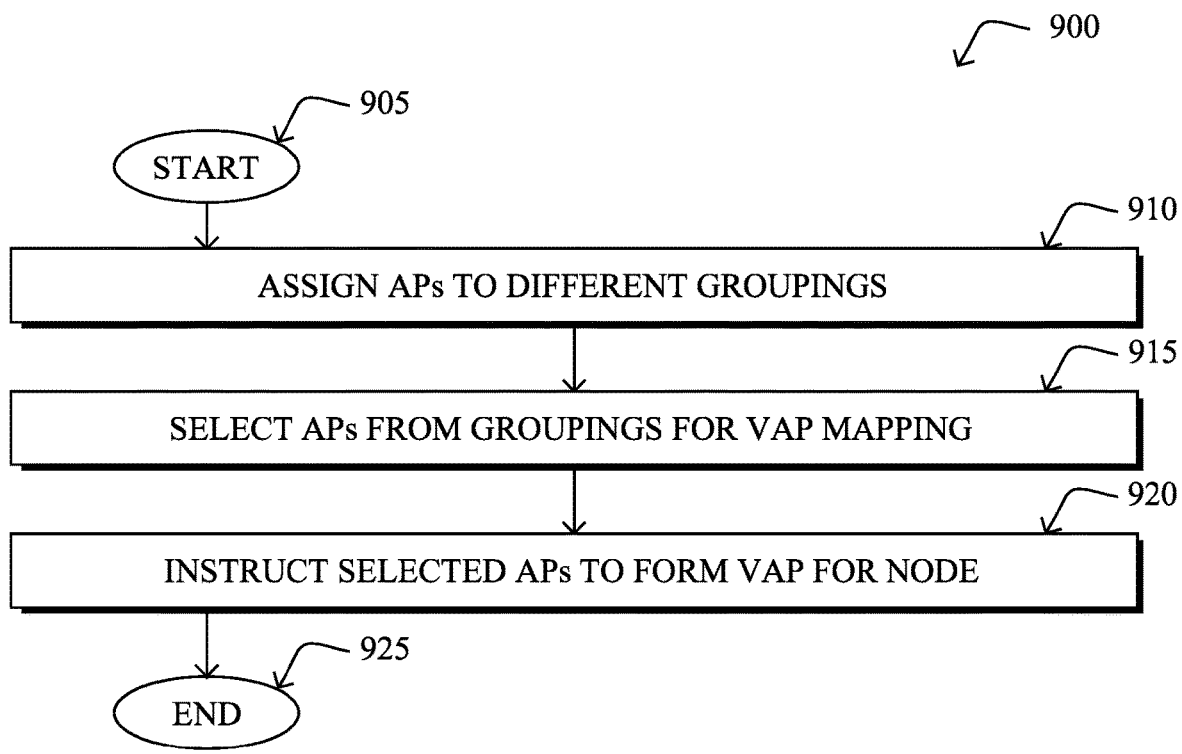
FIG. 9 illustrates an example simplified procedure for forming a VAP with path diversity.

FIG. 9 illustrates an example simplified procedure for forming a VAP with path diversity, according to various embodiments. For example, a non-generic, specifically configured device (e.g., device 200) may perform procedure 900 by executing stored instructions (e.g., process 248). Such a device may be, in some embodiments, a supervisory device such as a wireless controller in the network that oversees a plurality of APs in the network or, in further embodiments, a collection of one or more APs. The procedure 900 may start at step 905 and continue on to step 910 where, as described in greater detail above, the supervisory device may assign different APs to different AP groupings. In various embodiments, the different AP groupings may each use a different network path to communicate with a given endpoint in the network, such as a DetNet ingress and/or egress. In some embodiments, the path diversity may be achieved by grouping APs that are on different Layer 2 networks. In further embodiments, traffic engineering (TE) approaches may be used to ensure the path diversity between the different AP groupings.

At step 915, as detailed above, the supervisory device may select at least one AP from each of the AP groupings for mapping to a VAP for a node and as part of the VAP mapping. In some embodiments, the selection may be such that APs that are all within communication range of one another and the node are selected. In doing so, this allows the VAP APs to listen in to the communications of one another and, in cases of transmission failure, take corrective measures.

At step 920, the supervisory device may instruct the selected APs to form a VAP for the node, as described in greater detail above. From the standpoint of the node itself, it may treat the selected APs in the VAP mapping as a single AP for purposes of communicating with the network. For example, in some embodiments, the supervisory device may uniquely assign an SSID or PAN-ID for use by the node to communicate via the VAP. Procedure 900 then ends at step 925.

Figure 10:
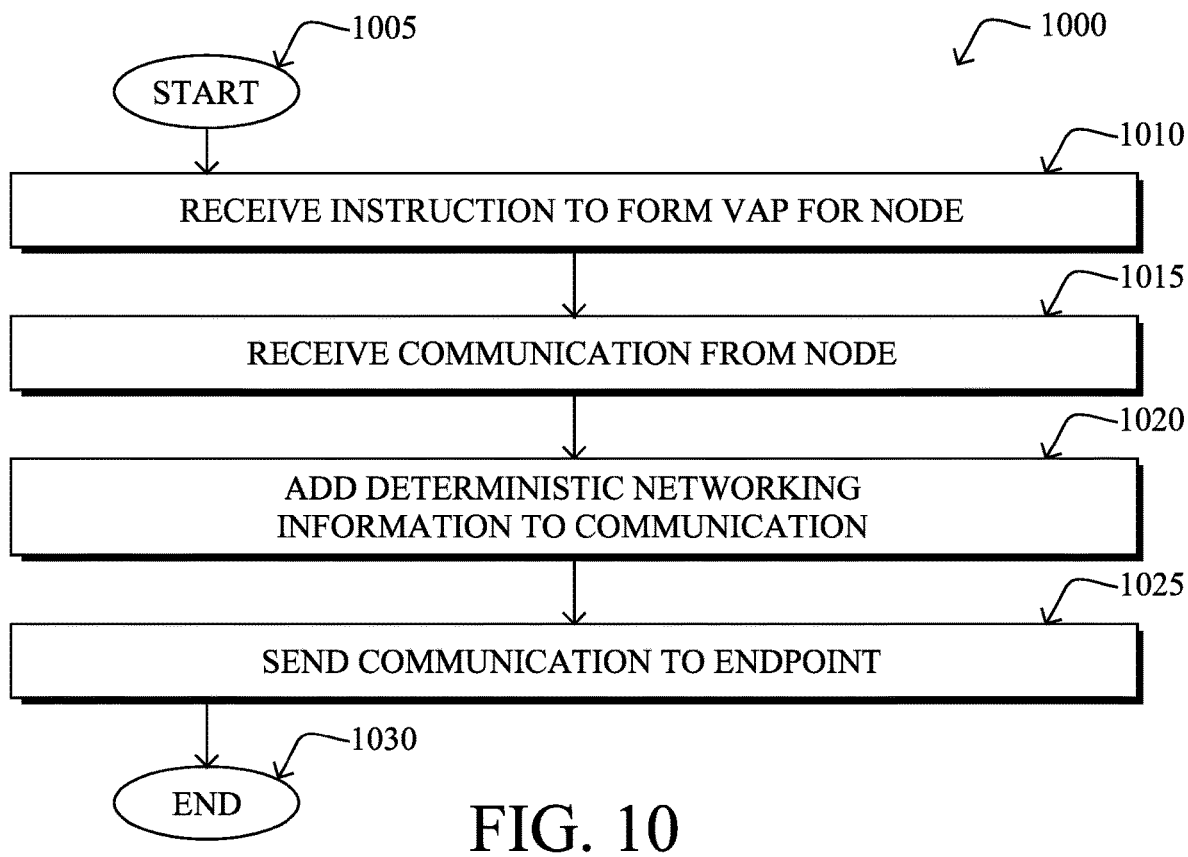
FIG. 10 illustrates an example simplified procedure for operating as part of a VAP.

FIG. 10 illustrates an example simplified procedure for operating as part of a VAP, according to various embodiments. For example, a non-generic, specifically configured device (e.g., device 200) may perform procedure 1000 by executing stored instructions (e.g., process 248). Such a device may be, in some embodiments, an access point for a network, in some embodiments. Procedure 1000 may start at step 1005 and continues on to step 1010 where, as described in greater detail above, the AP may receive an instruction to form a virtual access point (VAP) for a node. The APs in the network mapped to the VAP as part of a VAP mapping may be selected by a supervisory device from different AP groupings that use different network paths to communicate with a given endpoint in the network. The node itself may treat the APs in the VAP mapping as a single AP for purposes of communicating with the network.

At step 1015, as detailed above, the AP may receive a message/communication from the node. As noted above, the node itself may believe that it is communicating with only a single AP when, in fact, it is communicating with a plurality of APs in the VAP that all listen for transmissions from the node.

At step 1020, the AP may add DetNet information to the received communication from the node, as described in greater detail above. In general, such DetNet information may be operable to uniquely identify a given message/communication from the node within the network. For example, in various embodiments, the VAP APs may use precise time and may be synchronized using a time protocol within a given degree of precision that is finer than the time it takes to transmit a small frame. In turn, the VAP APs may timestamp the received message, allowing duplicates of the received message to be identified. In further embodiments, the DetNet information may comprise a sequence number, hash of the message, source MAC address, or any other information that can be used to distinguish duplicates of the message received by the various VAP APs for the node.

At step 1025, as detailed above, the AP may send the communication with the DetNet information to an endpoint, such as a DetNet egress. Similarly, any of the other APs in the VAP may also send copies of the communication received from the node with appropriate DetNet information. In cases where duplicates of the communication are received by the endpoint, the endpoint may use the DetNet information to eliminate duplicates of the communication. Procedure 1000 then ends at step 1030.

It should be noted that while certain steps within procedures 900-1000 may be optional as described above, the steps shown in FIGS. 9-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1000 are described separately, certain steps from each procedure may be incorporated into each other procedure, and the procedures are not meant to be mutually exclusive.

The techniques described herein, therefore, provide full path diversity for a virtual access point (VAP) protocol. In particular, the techniques herein, enable DetNet capabilities (e.g., packet replication and elimination, which reduces loss and improves jitter) over Wi-Fi and other wireless forms of networks, all the way from the node/STA to the DetNet edge, without requiring any changes to be made to the node itself to enable deterministic communications.

While there have been shown and described illustrative embodiments that provide techniques related to virtual access points (VAPs), it is to be understood that various other adaptations and modifications may be made within the spirit and scope of the embodiments herein. For example, while certain embodiments are described herein with respect to using certain environments, such as the IoT, other embodiments need not be limited to IoT devices. In addition, while certain protocols are shown, such as Wi-Fi and LoRa, other suitable protocols may be used, accordingly. For instance, while the techniques herein generally apply to a generalized CSMA/CA LLN, it should be specifically noted that the techniques can be applied to (based on) any of the standards mentioned above, including standard Wi-Fi networks. For ease of understanding (expecting the reader to be more familiar with the Wi-Fi parlance), the description above uses the terms of AP and STA from the Low Power Wi-Fi case. However, with Bluetooth LE, the central role illustratively maps to an AP, whereas the peripheral role is akin to an STA. The same goes for the 802.15.4 PAN coordinator which is similar to an AP, and the full-function device (FFD) or reduced-function device (RFD) which illustratively map to an STA, when 802.15.4 is used in plain hub-and-spoke (in that case a PAN ID illustratively serves as SSID). With DECT-ULE, the DECT Fixed Part is illustratively the AP, and the Portable Part is illustratively the STA.

Note that some protocols on Wi-Fi networking refer to a "virtual access point" as many different things. For example, hosting several logical APs in one physical AP may be referred to as a "virtual access point", while turning a PC into an AP may also be referred to as a "virtual access point". The VAPs in this present disclosure should not be confused with the shared terminology, and is completely different in that one VAP herein is distributed over multiple physical APs, and there can be one VAP per STA.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    assigning, by a supervisory device in a network, different access points in the network to different access point groupings, wherein each of the different access point groupings uses a different network path of a different Layer-2 network or a different traffic engineering (TE) path to communicate with a given endpoint in the network;
    selecting, by the supervisory device, at least one of the access points in each of the different access point groupings for mapping to a virtual access point (VAP) for a node in the network as part of a VAP mapping, wherein the selected access points are in communication range of one another; and
    instructing, by the supervisory device, the selected access points to form a VAP for the node, wherein the node treats the access points in the VAP mapping as a single access point for purposes of communicating with the network.

2. The method as in claim 1, wherein the selected access points for mapping to the VAP are synchronized using a time synchronization protocol.

3. The method as in claim 1, wherein instructing the selected access points to form the VAP for the node comprises:
    uniquely assigning, by the supervisory device, a service set identifier (SSID) or personal area network identifier (PAN-ID) to the node; and
    instructing, by the supervisory device, one or more of the selected access points in the VAP mapping to send the SSID or PAN-ID to the node, wherein the node uses the SSID or PAN-ID to access the network.

4. The method as in claim 1, wherein instructing the selected access points to form the VAP for the node comprises:
    instructing, by the supervisory device, the access points in the VAP mapping to take turns attempting to transmit copies of a communication to the node until the node acknowledges receipt of the communication from one of the access points in the VAP mapping.

5. The method as in claim 1, wherein instructing the selected access points to form the VAP for the node comprises:

instructing, by the supervisory device, the access points in the VAP mapping to use constructive interference to send a communication to the node.

6. The method as in claim 1, further comprising:
replacing, by the supervisory device, a particular one of the access points in the VAP mapping with another access point in the same access point grouping as the particular access point, based on a physical movement of the node.

7. An apparatus, comprising:
one or more network interfaces to communicate with a network;
a processor coupled to the network interfaces and configured to execute one or more processes; and
a memory configured to store a process executable by the processor, the process when executed operable to:
receive an instruction to form a virtual access point (VAP) for a node, wherein access points in the network mapped to the VAP as part of a VAP mapping are selected by a supervisory device from different access point groupings that use different network paths to communicate with a given endpoint in the network, and wherein the node treats the access points in the VAP mapping as a single access point for purposes of communicating with the network and the access points for mapping to the VAP are synchronized using a time synchronization protocol;
receive a communication from the node;
add deterministic networking information to the received communication; and
select the communication with the deterministic networking information to the endpoint, wherein the endpoint drops duplicate copies of the communication received from the access points in the VAP mapping based in part on the received deterministic networking information.

8. The apparatus as in claim 7, wherein the different network paths used by the access point groupings to communicate with the given endpoint in the network are on different Layer-2 networks.

9. The apparatus as in claim 7, wherein the different network paths used by the access point groupings to communicate with the given endpoint in the network are traffic engineering (TE) paths in the network.

10. The apparatus as in claim 7, wherein the deterministic networking information comprises at least one of: a timestamp, a hash of the communication, or a sequence number.

11. The apparatus as in claim 7, the process when executed further operable to:
receive a message destined for the node, wherein copies of the message are sent to each of the access points in the VAP mapping;
listen for a reception acknowledgement sent by the node in response to receiving the message from another one of the access points in the VAP mapping; and
send the message to the node based on a determination that the message sent by the other access point in the VAP mapping was not acknowledged by the node.

12. The apparatus as in claim 7, wherein the deterministic networking information is based on a Layer-2 nonce received by a wireless interface of the access point.

13. The apparatus as in claim 7, wherein the selected access points for mapping to the VAP are synchronized using a time synchronization protocol.

14. An apparatus, comprising:
one or more network interfaces to communicate with a network;
a processor coupled to the network interfaces and configured to execute one or more processes; and
a memory configured to store a process executable by the processor, the process when executed operable to:
assign different access points in the network to different access point groupings, wherein each of the different access point groupings uses a different network path of a different Layer-2 network or a different traffic engineering (TE) path to communicate with a given endpoint in the network;
select at least one of the access points in each of the different access point groupings for mapping to a virtual access point (VAP) for a node in the network as part of a VAP mapping; and
instruct the selected access points to form a VAP for the node, wherein the node treats the access points in the VAP mapping as a single access point for purposes of communicating with the network.

15. The apparatus as in claim 14, wherein the apparatus instructs the selected access points to form the VAP for the node by:
uniquely assigning a service set identifier (SSID) or personal area network identifier (PAN-ID) to the node; and
instructing one or more of the selected access points in the VAP mapping to send the SSID or PAN-ID to the node, wherein the node uses the SSID or PAN-ID to access the network.

16. The apparatus as in claim 14, wherein the apparatus selects the access points for the VAP mapping using a machine learning model.

17. The apparatus as in claim 14, wherein the process when executed to select access points to form the VAP for the node is further operable to:
instruct the access points in the VAP mapping to take turns attempting to transmit copies of a communication to the node until the node acknowledges receipt of the communication from one of the access points in the VAP mapping.

18. The apparatus as in claim 14, wherein the process when executed to select access points to form the VAP for the node further comprises:
instruct the access points in the VAP mapping to use constructive interference to send a communication to the node.

19. The apparatus as in claim 14, the process when executed further operable to:
replace a particular one of the access points in the VAP mapping with another access point in the same access point grouping as the particular access point, based on a physical movement of the node.

20. The apparatus as in claim 14, wherein the selected access points for mapping to the VAP are synchronized using a time synchronization protocol.

* * * * *